(12) United States Patent
Ichiyama

(10) Patent No.: US 6,307,293 B1
(45) Date of Patent: *Oct. 23, 2001

(54) MOTOR HAVING A HYDRODYNAMIC PRESSURE BEARING

(75) Inventor: Yoshikazu Ichiyama, Kyoto (JP)

(73) Assignee: Nidec Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,208

(22) Filed: May 18, 1999

(30) Foreign Application Priority Data

May 19, 1998 (JP) .................................. 10-137185

(51) Int. Cl.[7] .............................. H02K 7/09; F06C 32/06
(52) U.S. Cl. .......................................... 310/90.5; 384/123
(58) Field of Search ........................... 310/90, 91, 90.5, 310/66; 384/123, 121

(56) References Cited

U.S. PATENT DOCUMENTS

| 5,019,738 | * | 5/1991 | Weilbach et al. ................ 310/90.5 |
| 5,223,758 | * | 6/1993 | Kataoka et al. .................... 310/90 |
| 5,357,162 | * | 10/1994 | Aiyoshizawa et al. ............. 310/90 |
| 5,543,984 | | 8/1996 | Itoh ................................ 360/99.09 |
| 5,559,382 | * | 9/1996 | Oku et al. ......................... 310/90 |
| 5,659,445 | * | 8/1997 | Yoshida et al. ................. 360/98.07 |
| 5,675,201 | * | 10/1997 | Komura et al. .................. 310/90.5 |
| 5,707,154 | | 1/1998 | Ichiyama ........................... 384/107 |
| 5,810,479 | | 9/1998 | Miyasaka et al. ................ 384/107 |
| 5,977,676 | * | 11/1999 | Wijdenes .............................. 310/90 |
| 5,994,803 | * | 11/1999 | Jung .................................... 310/51 |

FOREIGN PATENT DOCUMENTS

407007886-A * 1/1995 (JP).

* cited by examiner

Primary Examiner—Nestor Ramirez
Assistant Examiner—Guillermo Perez
(74) Attorney, Agent, or Firm—James Judge

(57) ABSTRACT

Thin-profile spindle motor. Single hydrodynamic-pressure thrust and radial bearings are established about a thrust plate on the end of the motor shaft, encompassed by a cylindrical casing. Hydrodynamic pressure-generating grooves scored on either of the thrust plate end faces, or either of the inner faces of the casing ends opposing the thrust plate end faces, are a component of the single thrust bearing. A micro-gap clearance for the thrust bearing, retaining lubricant continuously with the radial bearing, is established on whichever side of the thrust plate the thrust bearing is formed. Like grooves scored on either the thrust plate circumferential surface, or the casing inner cylindrical surface by which it is opposed at a micro-gap clearance, the clearance itself, and lubricant retained therein form the single radial bearing. Means for magnetically counterbalancing the thrust hydrodynamic-pressure are provided between rotor hub and the stator or casing.

16 Claims, 15 Drawing Sheets

MOTOR HAVING A HYDRODYNAMIC PRESSURE BEARING

BACKGROUND OF THE INVENTION

1. Field of the Invention

The present invention relates to a motor, and in particular, to a motor having a hydrodynamic bearing structure which makes use of a lubricating fluid between adjacent surfaces of a rotary member and a stationary member, the motor being adapted to rotate a data storage media such as a hard disk in a hard disk drive.

2. Background Information

Conventionally, there has been known and used a motor equipped with a hydrodynamic bearing device which uses fluid pressure created between a shaft body and a sleeve structure in order to rotatably support the shaft body and the sleeve structure such that one of them is rotatable relative to the other. An example of such a motor is described in detail below with reference to FIG. 1.

FIG. 1 is a longitudinal sectional view schematically showing structure of a prior art motor 150 equipped with a bearing device using dynamic pressure of a fluid lubricant. As illustrated in FIG. 1, the conventional motor 150 equipped with a bearing configuration using hydrodynamic pressure has a cylindrical shaft housing 151 for rotatably supporting a rotary shaft 154, and the cylindrical shaft housing 151 has a large diameter base portion 151a. The outer peripheral surface of a lower portion of the large diameter base portion 151a is fixedly fitted in a circular engaging hole 152a of a base plate 152 of a recording medium drive device. The base portion 151a is integrally formed with an annular ring-shaped plate portion 151b. The annular ring-shaped plate portion 151b is further integrally formed with a small diameter sleeve portion 151c that is coaxially aligned with the base portion 151a and located above the base portion 151a. Further, a thrust cover 153 is fixedly engaged with an inner recessed surface of the base portion 151a adjacent to the lower end thereof, thereby blocking and sealing a disk shaped internal space defined within the base portion 151a.

In this way, a shaft supporting structure is thus formed with the use of the cylindrical shaft housing 151 and the thrust cover 153. The rotary shaft 154 is supported in a vertical orientation within the sleeve portion 151c of the cylindrical shaft housing 151 by a fluid lubricant 155, such as lubricating oil, that fills a clearance gap formed between surfaces of the rotary shaft 154 and the sleeve portion 151c due to liquid capillary action. The surfaces of the rotary shaft 154 and adjacent surfaces of the sleeve portion 151c serve as upper and lower radial bearings 170 and 171 using dynamic pressure of the lubricant 155 to support the rotary shaft 154 within the sleeve portion 151c such that the rotary shaft 154 is freely and relatively rotatable within the sleeve portion 151c.

A ring-shaped thrust plate 156 is fixedly fitted to a lower end of the rotary shaft 154 and is positioned in the disk shaped internal space that is defined within the base portion 151a. A clearance gap defined in the disk shaped internal space between the surfaces of the ring-shaped thrust plate 156 and the inner surface of the base portion 151a, the inner surfaces of the annular ring-shaped plate portion 151b and an upper surface of the thrust cover 153 is filled with lubricant 155 retained therein by capillary action. Upper and lower surfaces of the ring-shaped thrust plate 156 and adjacent surfaces of the base portion 151a, the plate portion 151b and thrust cover 153 serve as upper and lower thrust bearings allowing the annular ring-shaped thrust plate 156 to rotate freely within the cylindrical shaft housing 151 in combination with the dynamic pressure of the lubricant 155. In this manner, with the use of upper and lower hydrodynamic radial bearings 170 and 171 and upper and lower hydrodynamic thrust bearings, a hydrodynamic fluid bearing structure is formed which makes use of the hydrodynamic pressure of the fluid lubricant 155 during the relative rotation between the rotary shaft 154 (with the thrust plate 156) and the cylindrical shaft housing 151.

An annular groove 157 is formed at approximately a middle portion of the rotary shaft 154 separating the upper and lower radial bearings 170 and 171. The annular groove 157 is surrounded by an adjacent portion of the inner surface of the sleeve portion 151c forming an annular air space 159 that communicates with atmosphere outside the motor via a breather hole 158 formed on the sleeve portion 151c.

Herringbone grooves 160a and 160b are formed on lower and upper surfaces, respectively, of the thrust plate 156. Herringbone grooves 160c and 160d are formed on inner surfaces of the sleeve portion 151b below and above the annular air space 159, respectively. In response to rotation of the rotary shaft 154, radial load supporting pressure and thrust load supporting pressure are generated in the lubricant 155 in and about the herringbone grooves 160a, 160b, 160c and 160d.

A stator 161 formed with coil windings (not shown) around a stator core (not shown) is fixed on an outer surface of the sleeve portion 151c. A cup-like rotor hub 162 is formed with an outmost enclosure wall 162a that encircles the stator 161. The upper end of the rotary shaft 154 extends into a center hole formed in the cup-like rotor hub 162 such that the rotary shaft 162 is engaged and fixed to the cup-like rotor hub 162. A rotor magnet 163 is secured on an internal surface of the outmost enclosure wall 162a of the rotor hub 162 such that the rotor magnet 163 radially faces the stator 161 with a predetermined clearance space maintained therebetween thereby forming a rotation driving structure.

When using the above-described conventional hydrodynamic fluid bearing assembly having upper and lower radial hydrodynamic bearings and upper and lower hydrodynamic thrust bearings, the ring-shaped thrust plate 156 is used in the hydrodynamic thrust bearing structure. In order to ensure a stabilized support for the rotary shaft 154 in the axial direction and thereby minimize possible vibrations in that direction, both upper and lower surfaces of the thrust plate 156 must be used to form upper and lower thrust bearings. However, there is a problem associated with using both upper and lower surfaces of the thrust plate as bearings in that bearing losses due to, for instance, fluid friction, may be large and as a result the electric efficiency of the motor may be low.

When a hydrodynamic bearing motor 150 described above is to be installed in a thin hard disk drive (HDD) whose thickness is, for example, less than 5 mm, the sleeve portion 151c, the rotary shaft 154, the stator 161 and the rotary magnet 163 somehow have to be made shorter in the vertical direction, as viewed in FIG. 1. When a hydrodynamic bearing motor 150 is used in such a thin and low-noise hard disk drive with the motor being provided with both upper and lower radial hydrodynamic bearings, upper and lower thrust hydrodynamic bearings provided on upper and lower sides of a thrust plate 156, the rotary shaft 154 and the thrust plate 156 may be supported stably with minimal axial vibrations. Although the thrust hydrodynamic bearings on both sides of the thrust plate may ensure stability of the rotary shaft 154 in the axial direction, the grooves 160*a* and 160*b* generate large viscous resistance against the flow of the lubricant 155 resulting in bearing loss making the motor electrically inefficient.

Also known is a hydrodynamic bearing motor in which no thrust plate 156 is employed. Instead a thrust bearing is formed on an end surface of a rotary shaft. In this case, although bearing loss is small and the motor is relatively electrically efficient, the motor requires some kind of axial movement prevention mechanism to prevent movement of the rotary shaft in the axial direction, since the rotary shaft does not have a projection such as a thrust plate for retaining the rotary shaft within a motor housing. When impact is applied to the motor, large axial movement of the rotary shaft may occur causing undesirable contact between a magnetic head and a data storage medium such as a hard disk on which the magnetic head writes and reads data, thereby adversely affecting the reading and writing functions of the magnetic head and possibly damaging the magnetic head and the recording medium.

In view of the above, there exists a need for a motor which overcomes the above mentioned problems in the prior art. The present invention attempts to solve the problems associated with the above described related art, as will become apparent to those skilled in the art from the following description of the present invention.

SUMMARY OF THE INVENTION

One object of the present invention is to provide a thin type motor which requires a small amount of electric energy for rotation of the motor and has a small amount of play of a rotary shaft in the axial direction.

Another object of the present invention is to provide a thin type motor which operates stably.

Another object of the present invention is to provide a thin motor with a small amount of bearing losses associated with grooves in thrust bearings.

In one aspect of the present invention, a motor includes a rotary shaft, a circular or disk-shaped thrust plate fixed to a lower end of the shaft, and a supporting structure for supporting the shaft. The thrust plate is accommodated in a disk shaped space formed in the supporting structure, with a gap or clearance being formed between the outer surfaces of the thrust plate and the inner surfaces of the supporting structure adjacent to the outer surfaces of the thrust plate. One of the axial end surfaces of the thrust plate, an adjacent one of the inner surfaces of the supporting structure and lubricant filling a clearance gap therebetween constitute a thrust bearing of the motor. A radially outer peripheral surface of the thrust plate, an adjacent inner surface of the supporting structure and lubricant oil therebetween constitute a radial bearing of the motor. Grooves are formed on the surfaces of the supporting structure constituting the radial and thrust bearings to create hydrodynamic forces in the lubricant in response to rotation of the thrust plate such that the thrust plate and the rotary shaft are urged in a first axial direction. Magnetic biasing means is provided in the motor to counterbalance the hydrodynamic forces in the thrust bearing urging the rotary shaft and thrust plate in a second axial direction opposite the first axial direction. The magnetic biasing means therefore functions as a second thrust bearing to balance axial forces acting on the rotary shaft and thrust plate in the motor thereby maintaining the rotary shaft and thrust plate in a stable axial position within the support structure of the motor.

In one embodiment, a cup-shaped rotor hub is fixed to an upper end of the rotary shaft. The magnetic biasing means includes a pair of permanent magnets provided on adjacent surfaces of the supporting structure and the rotor hub. The pair of magnets are oriented such that their respective magnetic forces repulse one another thereby causing the rotor hub, rotary shaft and thrust plate to be urged upward. The hydrodynamic forces in the lubricant are such that the thrust plate, rotary shaft and rotor hub are urged downward thereby maintaining the rotary shaft in a stable, desirable location with respect to the support structure.

Alternatively, the pair of magnets may be oriented such that their respective magnetic forces attract one another causing the rotor hub, rotary shaft and thrust plate to be urged downward. In this alternative arrangement, the grooves formed on the surfaces of the supporting structure constituting the radial and thrust bearings to create hydrodynamic forces that urge the thrust plate, rotary shaft and rotor hub upward to maintain the rotary shaft in a stable, desirable location with respect to the support structure.

In another embodiment, a stator coil is fixed to an outer surface of the support structure. A rotor magnet is fixed to an inner surface of a rotor hub that is fixed to an upper end of the rotary shaft. The rotor magnet and the stator each have magnetic centers that are spaced apart from each other in the axial direction such that the magnetic center of the rotor magnet is urged toward the magnetic center of the stator coil by magnetic forces. In this way, the rotor magnet, rotor hub, rotary shaft and thrust plate are urged in an axial direction opposite the hydrodynamic forces created in the lubricant by the grooves formed on the surfaces of the supporting structure constituting the radial and thrust bearings. The magnetic centers of the rotor magnet and the stator coil may be offset such that the rotor magnet is urged downward against upward hydrodynamic forces, or alternatively, the magnetic centers of the rotor magnet and the stator coil may be offset such that the rotor magnet is urged upward against downward hydrodynamic forces.

These and other objects, features, aspects and advantages of the present invention will become apparent to those skilled in the art from the following detailed description, which, taken in conjunction with the annexed drawings, discloses a preferred embodiment of the present invention.

DETAILED DESCRIPTION OF THE PREFERRED EMBODIMENTS

First Embodiment

A motor having a hydrodynamic bearing in accordance with a first embodiment of the present invention is described below with reference to FIGS. 2–6. However, it should be understood that the present invention is not to be limited to the embodiments described below.

Figure 2:
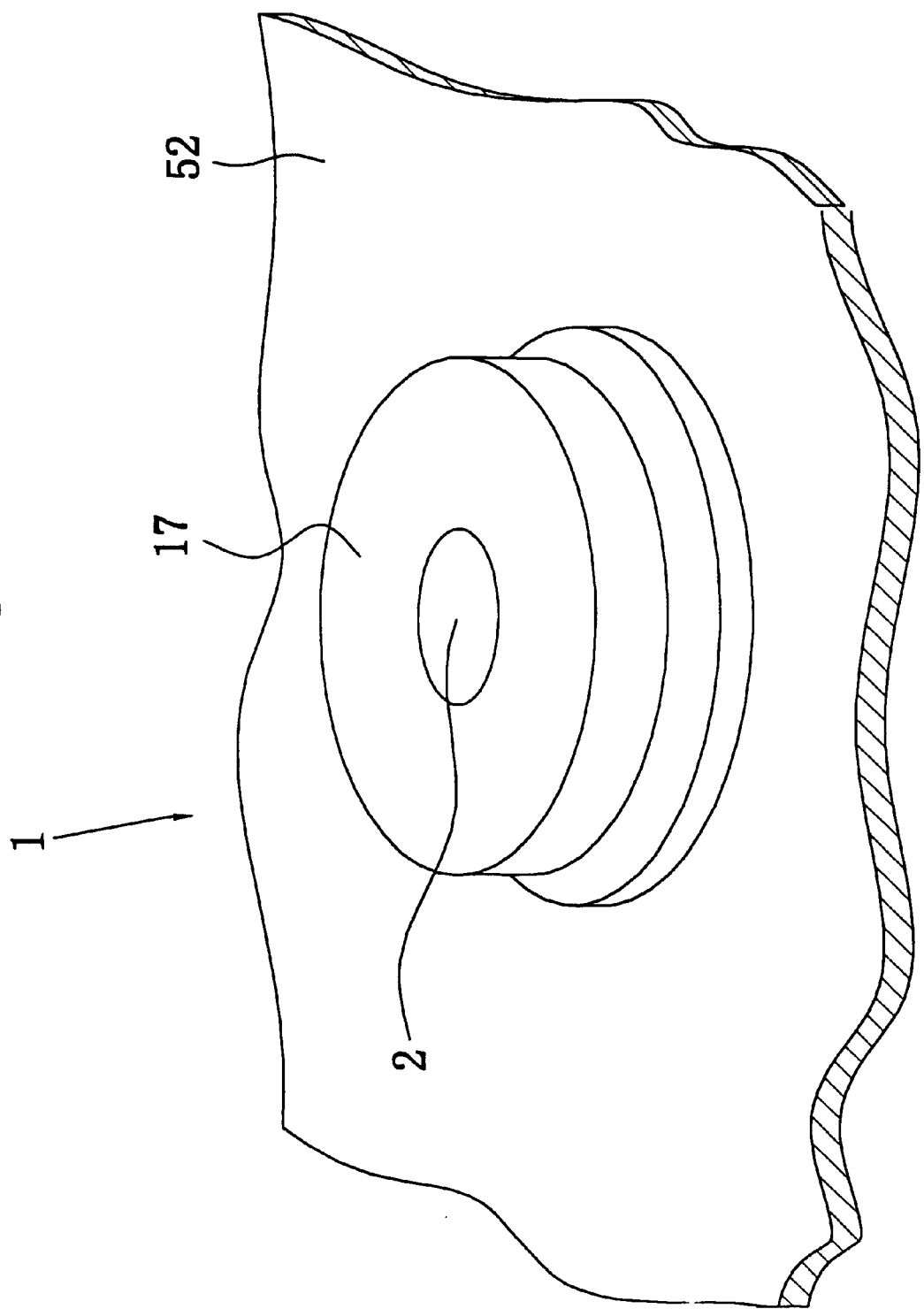
FIG. 2 a schematic perspective view of a motor according to a first embodiment of the present invention.

Referring to FIG. 2, the motor 1 includes a rotary shaft 2, a disk-shaped thrust plate 3 having a center bore that is fixedly fitted to an outer periphery of a lower end portion of the rotary shaft 2 and a support housing 4 which supports both the thrust plate 3 and the rotary shaft 2 in a manner described in greater detail below.

The support housing 4 includes a cylinder member 6, an annular thrust ring 7 and a disk-shaped thrust cover 5. An inner surface of the cylinder member 6 is formed with an annular protrusion 6p that divides the inner surface of the cylinder member 6 into upper and lower inner surfaces 6u and 6l. The annular thrust ring is fixedly fitted to the cylindrical member 6 such that an outer peripheral surface of the annular thrust ring 7 is in friction engagement with the inner upper surface 6l of the cylinder member 6 and a radially outer portion of a lower surface of the annular thrust ring 7 engages an upper surface of the annular protrusion 6p. The disk-shaped thrust cover 5 is fixedly fitted to the cylinder member such that an outer peripheral surface of the disk-shaped thrust cover 5 is in friction engagement with the inner lower surface 6l of the support housing 4 and a radially outer portion of an upper surface of the disk-shaped thrust cover 5 engages a lower surface of the annular protrusion 6p. The annular thrust ring 7 is formed with a center bore though which the rotary shaft 2 extends.

A lower portion of the cylinder member 6 of the support housing 4 is fixedly fitted in a circular bore 52a of a bracket 52. The bracket 52 may be a stationary support member within a data storage medium driving device, such as a hard disk drive or other data storage device. A stator 16 is fixedly fitted to the outer periphery of the cylinder member 6 of the support housing 4 above the bracket 52. An annular stationary magnet 20 is fixedly disposed in a groove formed on the upper surface of the cylinder member 6, the annular stationary magnet 20 being explained in greater detail below.

An upper end of the rotary shaft 2 is fixedly fitted in a central bore formed in a rotor hub 17. The rotor hub 17 is an annular member having an inverted cup-like shape with a radially outer ring portion that extends downward encircling the stator 16. A rotor magnet 18 is fixedly fitted to an inner surface of the outer ring portion of the rotor hub 17 encircling and confronting the stator 16 thereby defining a clearance gap between the rotor magnet 18 and the stator 16.

An annular magnet 19 is disposed in a groove formed on a lower surface of the rotor hub 17 immediately above and confronting the annular stationary magnet 20 disposed on the cylinder member 6 with a clearance gap being formed between the annular magnet 19 and the annular stationary magnet 20.

The support housing 4, the thrust cover 5, the thrust ring 7, the bracket 52 and the stator 16 define a rigid stationary support structure. The rotary shaft 2, the thrust plate 3, the rotary hub and the rotor magnet 18 define a generally rigid rotatable body that is rotatable with respect to the support structure.

The thrust plate 3 includes upper and lower surfaces 3a and 3b, and a radially outer peripheral surface 3c defined therebetween. The outer peripheral surface 3c of the thrust plate 3 confronts an adjacent inner peripheral surface of the cylinder member 6 with a small gap defined therebetween filled with a lubricant 8 that is preferably a fluid. The bottom surface of the annular thrust ring 7 is adjacent to and confronts the upper surface 3a of the thrust plate 3 with a small gap therebetween. The gap is filled with the lubricant 8. The bottom surface 3b of the thrust plate 3 is adjacent to and confronts the upper surface of the thrust cover 5 with a small gap therebetween filled with lubricant 8 only at a radial outer portion thereof, as is explained in greater detail below. The lubricant 8 may be any of a variety of lubricating oils known in the art, filling the above mentioned gaps and retained therein by capillary action between the thrust plate 3 and the annular thrust ring 7, and between the thrust plate 3 and the thrust cover 5. It should be understood that the thrust plate 3 is located inside a space defined between the annular thrust ring 7 and the thrust cover 5 and confined radially by the cylinder member 6.

Figure 4:
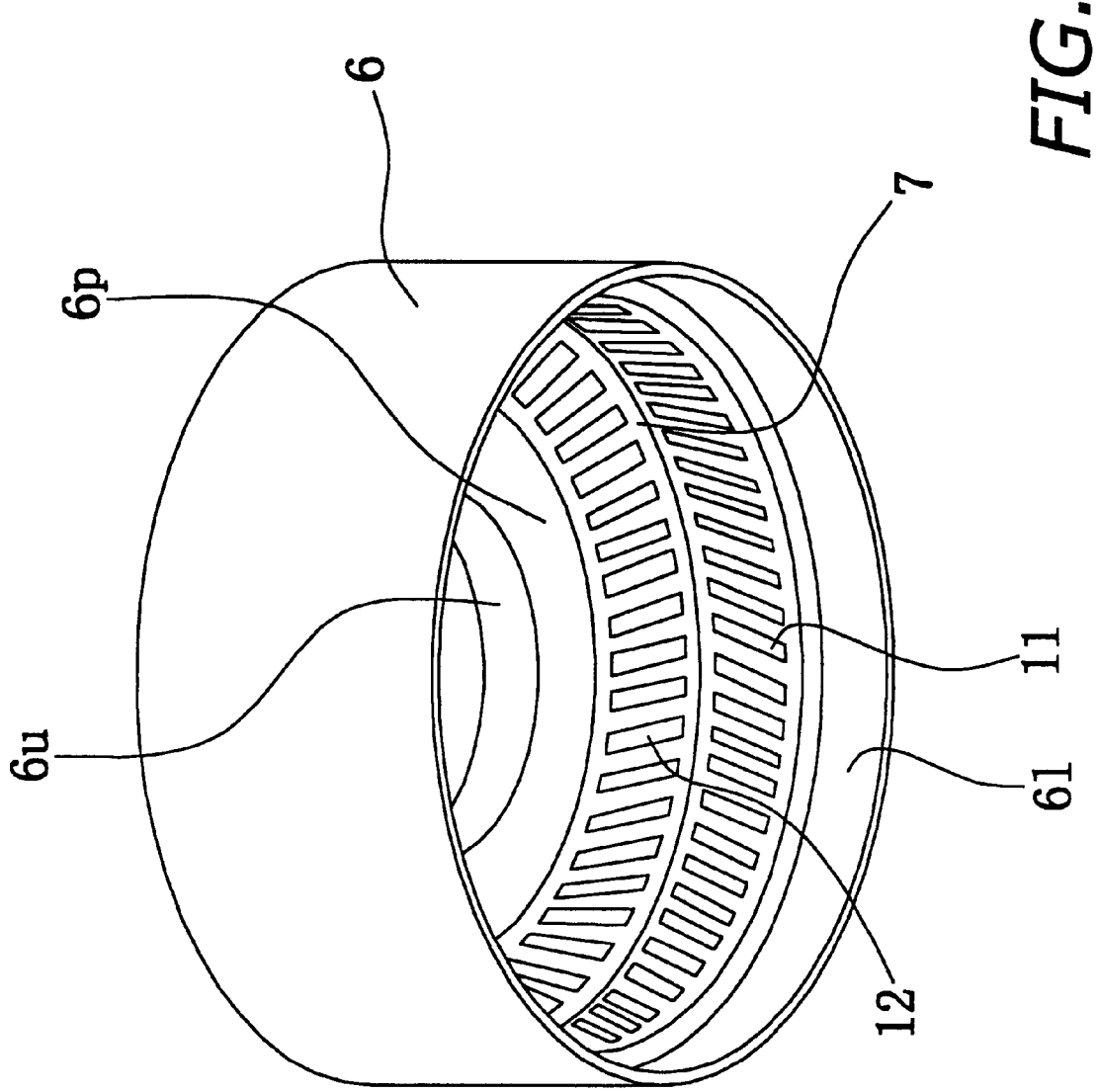
FIG. 4 is perspective view of the housing depicted in FIG. 3 looking from an underside thereof with portions of the motor removed to show details of spiral grooves formed on inner surfaces of the housing.

An underside of the cylinder member 6 is depicted in FIG. 4 with the thrust cover 5 removed. As can be seen in FIG. 4, an inner circumferential surface of the cylinder member 6 is formed with spiral grooves 11 and a lower surface of the annular thrust ring 7 is formed with spiral grooves 12. The spiral grooves 11 and 12 are dynamic pressure generating grooves which induce movement of the lubricant 8 when the rotatable body rotates with respect to the support structure, thus creating fluid dynamic pressure, as is described below in greater detail.

Figure 5:
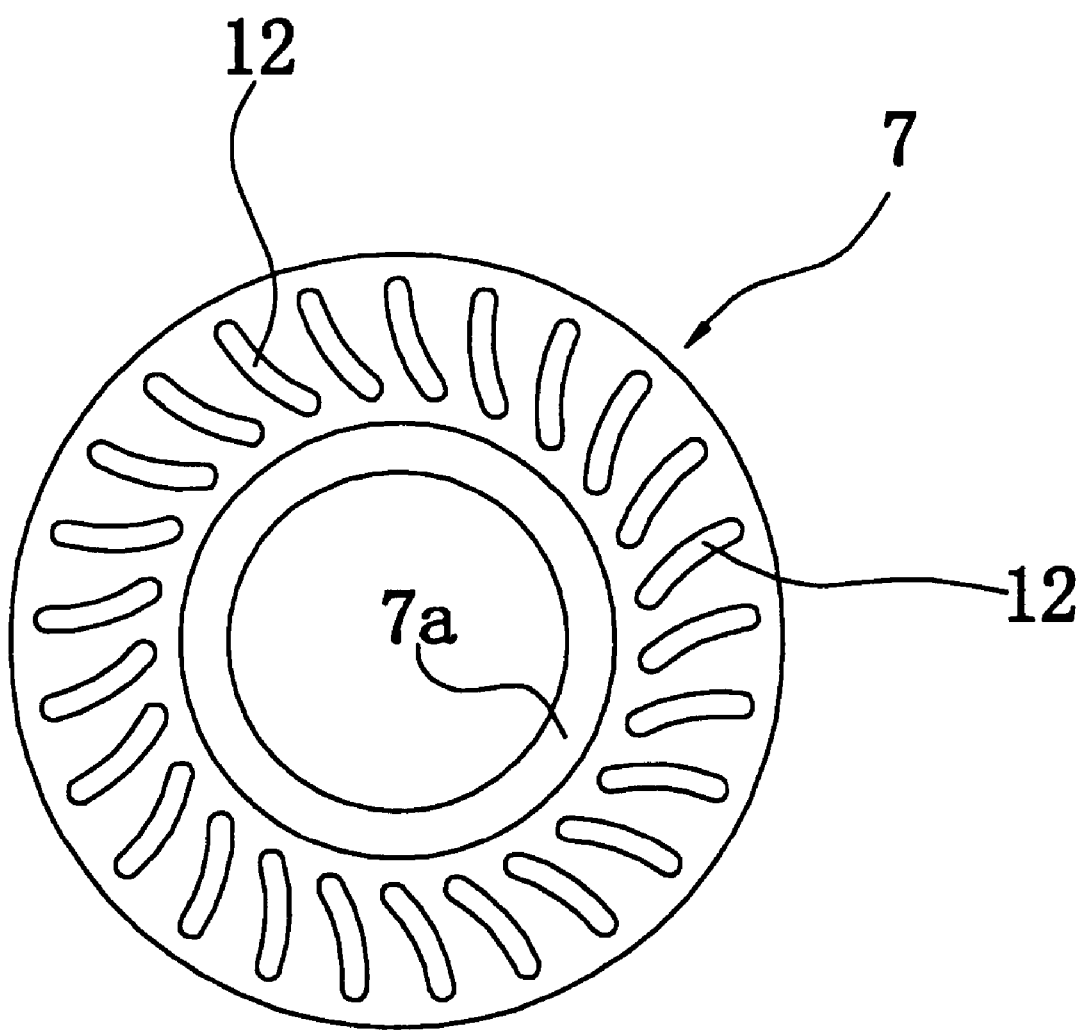
FIG. 5 is a bottom view of an annular thrust ring having spiral grooves formed thereon, with the annular thrust ring shown removed from the housing depicted in FIGS. 3 and 4.

The spiral grooves 11 and 12 may have any of a variety of shapes so long as the shape of the grooves induces movement of lubricant in a manner described in greater detail below. For instance, the spiral grooves 12 in the annular thrust ring 7 may be formed as a series of generally straight grooves that are angularly offset from rays extending from a central axis of the annular thrust ring 7, as is depicted in FIG. 4, or alternatively, the spiral grooves 12 may have an arcuate shape as depicted in FIG. 5. It should be appreciated that these are only two such examples of the shape of spiral grooves and a variety of alternate shapes and configurations are possible.

Figure 3:
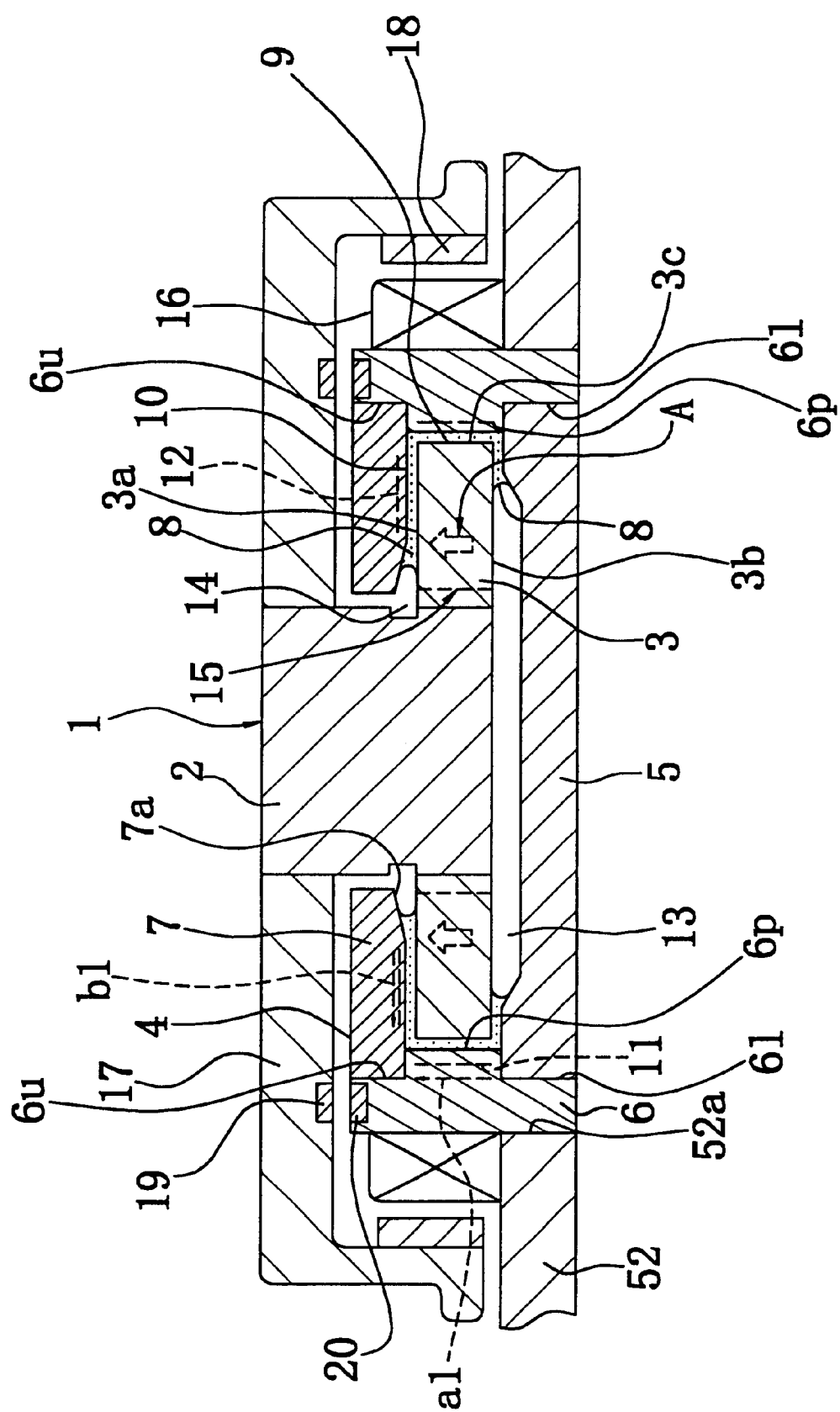
FIG. 3 is a longitudinal cross sectional side view of the motor depicted in FIG. 2 showing internal details of a housing, rotary shaft and a hydrodynamic bearing.

The spaces in, adjacent to, and around the spiral grooves 11 and 12 retain lubricant 8. An inner radial portion of the lower surface of the annular thrust ring 7 is formed with a conical surface 7a that is inclined upward toward an axial center of the annular thrust ring 7. The conical surface 7a and an adjacent portion of the upper surface 3a of the thrust plate 3 define a seal which acts on the lubricant 8 such that surface tension of the lubricant 8 in balance with atmospheric pressure of the surrounding air forms a meniscus which, along with capillary action, retains the lubricant 8 (a fluid) in the gaps between adjacent surfaces, as shown in FIG. 3. A similar seal is formed between a conical surface formed on a radial outward portion of the thrust cover 5 and adjacent portion of the lower surface 3b.

The radial inner surface of the cylinder member 6 around the spiral grooves 11, the radial outer surface 3c of the thrust plate 3 and lubricant 8 therebetween constitutes a radial bearing 9 that bears radial loads of the shaft 2 when the shaft 2 is rotating.

The portions of the lower surface of the annular thrust ring 7 radially outward from the conical surface 7a, the upper surface 3a of the thrust plate 3, the spiral grooves 12, and the lubricant 8 in the gap therebetween constitute a thrust bearing 10 which bears loads on the shaft 2 which act in an axially upward direction when the shaft 2 is rotating.

The radial bearing 9 and the thrust bearing 10 form a hydrodynamic bearing configuration in the support housing 4 which supports the thrust plate 3 fixed to the rotary shaft 2, such that the thrust plate 3 and rotary shaft 2 are relatively rotatable within the support housing 4 about a rotational axis of the rotary shaft 2. The thrust plate 3 must be thick enough to: provide strength in the axial direction and to be securely coupled to the rotary shaft 2; and insure that the radial bearing 9 generates adequate amounts of radial load support pressure. In view of the above requirements, the thrust plate 3 should ideally be at least 1.0–1.5 mm, or may possibly have a maximum thickness of 2.0 mm if the motor requirements are such that the overall size of the motor may be thicker in the axial direction.

When the rotary shaft 2 and thrust plate 3 rotate with respect to the support housing 4, the spiral grooves 11 in the radial bearing 9 (the spiral grooves 11 being dynamic pressure generating grooves) urge lubricant 8 axially upward toward the annular thrust ring 7 creating a fluid pressure buildup between radially outward portions of the annular thrust ring 7 and the thrust plate 3. The forces associated with the upward fluid pressure build up is represented as axial force a1 in FIG. 3. Further, the spiral grooves 12 on the lower surface of the annular thrust ring 7 of the thrust bearing 10 urge lubricant 8 radially outward toward the cylinder member 6 as the shaft 2 and thrust plate 3 rotate. The radially outward force created in the lubricant 8 when acted upon by the spiral grooves 12 (dynamic pressure generating grooves) is represented in FIG. 3 as radial force b1. Specifically, as the thrust plate 3 and rotary shaft 2 rotate, the spiral grooves 11 and 12 generate fluid dynamic pressure by moving the lubricant 8 axially upward and radially outward toward the outer periphery of the upper surface of the thrust plate 3. The combination of the radial force b1 and the axial force a1 is such that the buildup of fluid pressure between the thrust plate 3 and the annular thrust ring 7 causes the thrust plate 7 and the rotary shaft 2 to be urged downward, as is discussed further below.

In the first embodiment of the present invention, the spiral grooves 11 are formed on the inner peripheral surface of the cylinder member 6, whereas the spiral grooves 12 are formed on the bottom surface of the annular thrust ring 7. By employing the spiral grooves 11 and 12 in the motor of the present invention, it is possible to use thrust plate 3 having a smaller diameter and thickness, compared with a conventional motor in which only herringbone grooves are formed in a conventional hydrodynamic bearing configuration, as is made more clear below.

A thrust air interposing space 13 is defined between central portions of the lower surface 3b of the thrust plate 3 and the thrust cover 5, in which air is retained. Another air space 14 is defined above radial inner portions of the upper surface 3a of the thrust plate 3 radially inward from the thrust bearing 10, the air space 14 being in communication with outside air via spaces defined between the rotor hub 17 and stator 16. The air spaces 13 and 14 are in communication with each other through an air conduit 15 formed in an inner periphery of the thrust plate 3. The term outside air refers to the air located outside the motor 1 and inside a device to which the motor 1 is installed. The pressure of outside air is not necessarily standard atmospheric pressure, although the pressure may be standard atmospheric pressure.

The thrust air interposing space 13 below the lower surface 3b of the thrust plate 3 is open to the outside air through the air conduit 15 and the air space 14 formed on the upper surface of the thrust plate 3 such that air pressure in each of the air spaces 13 and 14 are equalized and are the same as the pressure of the outside air. Since the surface tension of the lubricant 8 is affected by the air pressure in the air spaces 13 and 14, which is the pressure of the outside air, and the air pressure in each of the air spaces 13 and 14 are equal, there is no movement of the lubricant 8 due to pressure differences in either of the air spaces 13 and 14, thereby ensuring the reliability of the bearings 9 and 10. Therefore, if the amount of the lubricant 8 decreases due to such factors as evaporation, the volume of air in the air spaces 13 and 14 may expand equally because identical atmospheric pressures act in each space. Further, the lubricant 8 adjacent to but not previously disposed in and about the bearings 9 and 10 is urged into the bearings 9 and 10 to replenish lubricant 8 with an amount equal to an amount of lubricant lost due to, for instance, evaporation. Accordingly, the bearings 9 and 10 are always supplied with a sufficient amount of the lubricant 8, thereby enabling an improvement of the reliability of the motor 1. In the first embodiment, as was mentioned above, the bottom surface of the annular thrust ring 7 is formed with the conical surface 7a and the upper surface of the thrust cover 5 is formed with a similar conical surface defining seals or boundaries between the lubricant 8 and the air spaces 13 and 14, where a meniscus forms to assist in retaining the lubricant 8 in the gaps between the thrust plate 3 and the thrust plate 7, and between the thrust plate 3 and the annular thrust ring 5. The conical surfaces promote the effects of surface tension on the lubricant 8, thus defining the meniscus, and also provide a small reservoir of lubricant. The small reservoir of lubricant provides a means for replenishing lost lubricant 8.

In the motor 1, since the air spaces 13 and 14 are radially inward from the thrust bearing and the air spaces 13 and 14 are connected via the air conduit 15, the surface tension of the exposed surfaces of the lubricant 8 is acted upon by the same air pressure, whereby the lubricant does not flow into either of the air spaces 13 or 14, thus insuring reliable operation of the bearings 9 and 10 and even distribution of the lubricant 8.

Since the bearings 9 and 10 include the spiral grooves 11 and 12, the electrical efficiency is improved, and the structure of the motor 1 is simplified by elimination of cumbersome oil circulating structures present in some prior art configurations, leading to a reduction of production cost of the present invention compared to prior art configurations.

Air bubbles may form in the lubricant 8 for a variety of reasons, and in particular as the motor 1 rotates air bubbles may form due to the forces generated by the spiral grooves 11 and 12. The motor 1 is designed to exhaust such air bubbles to outside the bearings 9 and 10 into the air spaces 13 and 14, thereby preventing the lubricant 8 from leaking out of the bearings 9 and 10. Further, the air spaces 13 and 14 also allow for movement of the lubricant 8 due to thermal expansion of the lubricant 8 itself and thermal expansion of the motor 1 components from the heat generated by the motor 1.

The thrust plate 3 limits the upward axial movement of the rotary shaft 2. An undesirable large amount of axial movement of the rotary shaft 2 is therefore prevented, thereby preventing a data storage medium which is mounted on the rotor, and a magnetic head which is disposed adjacent to the data storage medium to read and write data therefrom and thereto, from contacting each other even when impact is applied thereto, preserving the quality of the data storage medium and the magnetic head. Since the motor 1 has the thrust plate 3 confined within the support housing 4 which limits the axial movement of the rotary shaft 2, no additional structure is needed to prevent the rotary shaft 2 from detaching from the motor 1, as has been necessary in prior art motors that do not include an annular projecting portion such as a thrust plate.

The thrust air interposing space 13 defined below the lower surface 3b of the thrust plate 3 and has a diameter that is greater than the diameter of the air space 14, the thrust bearing 10 is only formed only on the upper surface 3a of the thrust plate 3. In other words, there is only one hydrodynamic thrust bearing in the motor 1 of the present invention and that thrust bearing 10 is configured such that it only restricts upward movement of the thrust plate 3.

The stationary magnet 20 and the magnet 19 are magnetized in the axial direction with respect to the rotary shaft 3 so have generally identical magnetic poles facing one another. In other words, the stationary magnet 20 is magnetized with, for instance, a north pole facing a north pole of the magnet 19. Therefore, the stationary magnet 20 and the magnet 19 produce a magnetic repelling force with respect to one another thereby urging the rotor hub 17, the rotary shaft 3 and the thrust plate 3 upward. However, it should be understood that the stationary magnet 20 and the magnet 19 may also have respective south poles facing one another. The magnetic repelling force produced by the interaction of the stationary magnet 20 and the magnet 19 being close to one another lifts the rotor hub 17 upward by a force represented by the arrow A in FIG. 3. Since the stationary magnet 20 and the magnet 19 magnetically repel each other, the rotor hub 17 to be urged axially upward, which in turn makes the upper surface of the thrust plate 3 move upward toward the bottom surface of the annular thrust ring 7, with the thrust bearing 10 therebetween.

According to the above described structure, when the stator 16 has electricity applied to it by a power source (not shown), the rotary shaft 2 and the thrust plate 3 start rotating together within the support housing 4. While the motor 1 is rotating, the spiral grooves 11 and 12 in the radial bearing 9 and the thrust bearing 10, respectively, urge the lubricant 8 retained in the gaps between the thrust plate 3 and the support housing 4 toward the outer peripheral edge of the upper surface 3a of the thrust plate 3. Specifically the spiral grooves 11 create an upward force a1 in the lubricant 8 in the vicinity of the radial bearing 9 thereby moving the lubricant 8 upward, and the spiral grooves 12 create a radially outward force b1 in the lubricant 8 in the vicinity of the thrust bearing 10 thereby moving the lubricant 8 radially outward toward the cylinder member 6. The combination of the upward force a1 and the radially outward force b1 creates fluid pressure between the upper surface 3a of the thrust plate 3 and the lower surface of the annular thrust ring 7 urging the thrust plate 3 downward, with respect to FIG. 3.

Simultaneously, the rotor hub 17, the rotary shaft 2 and the thrust plate 3 are all urged upward by the force A which results from the interaction between the stationary magnet 20 and the magnet 19. In effect, the interaction between the stationary magnet 20 and the magnet 19 serves as a second thrust bearing. Further, as the fluid pressure between the upper surface 3a of the thrust plate 3 and the lower surface of the annular thrust ring 7 increases as rotational speed of the rotary shaft 2 increases, the forces a1 and b1 increase correspondingly due to the action of the spiral grooves 11 and 12, thereby urging the thrust plate 3 downward. As the thrust plate 3 is urged downward in response to increases in the forces a1 and b1, the stationary magnet 20 and the magnet 19 are moved correspondingly closer to one another. Since magnets of like polarity induce exponentially increasingly repellant forces as they get closer to one another, the stationary magnet 20 and the magnet 19 naturally repel one another as they get closer to one another. Therefore, as the forces a1 and b1 increase, the force A, due to repelling interaction between the stationary magnet 20 and the magnet 19, correspondingly increases thereby balancing the overall forces acting on the thrust plate 3, rotary shaft 2 and rotor hub 17 and maintaining the thrust plate 3 in a desirable location between the thrust cover 5 and annular thrust ring 7.

Figure 1:
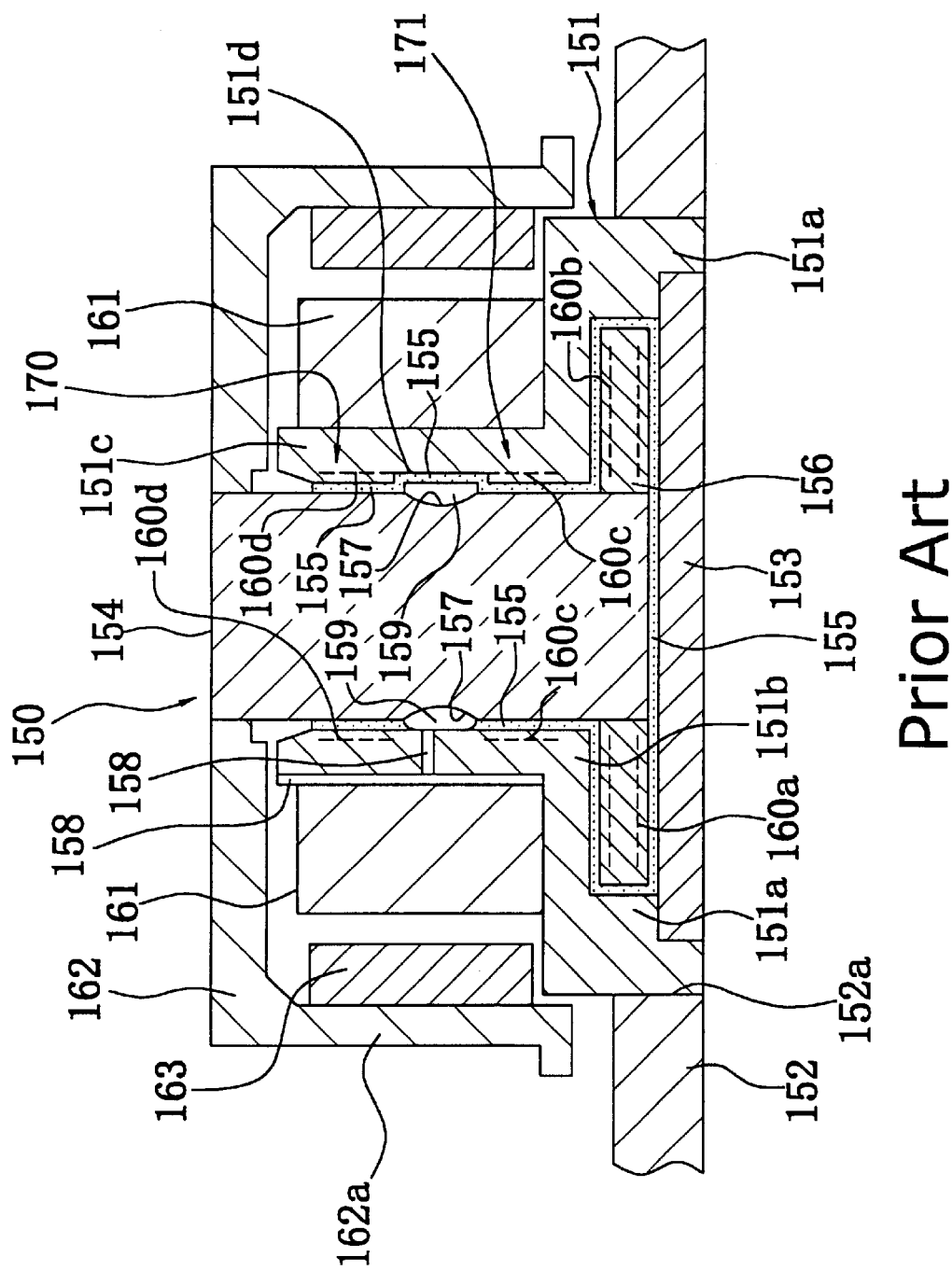
FIG. 1 is a longitudinal cross sectional side view of a conventional motor that includes upper and lower hydrodynamic thrust bearings on a thrust plate and upper and lower hydrodynamic radial bearings on a rotary shaft.

Therefore, as compared with the conventional motor as shown in FIG. 1, when the hydrodynamic bearing of the present invention is used, for instance, in a rotary shaft type low noise spindle motor having a thrust plate and adapted to be used in a thin hard disk drive (HDD) whose thickness is less than 5 mm, the spiral grooves 11 and 12, instead of conventional herringbone grooves, are used as the dynamic pressure generating grooves of the radial bearing 9 and the thrust bearing 10. Since the spiral grooves 11 and 12 have simple structure and can reduce viscous resistance of the lubricant 8, the motor 1 can have better electric efficiency and a lower production cost than a motor having only herringbone grooves. Also, the thrust plate 3 of the motor 1 can dampen axial vibrations.

By virtue of the thrust plate 3 in combination with the magnets 19 and 20, axial movement of the rotor hub 17, rotary shaft 2 and thrust plate 3 in the motor can be limited to an amount of movement necessary and sufficient to enable relative rotation of the rotor hub 17, rotary shaft 2 and thrust plate 3, with the lubricant 8 disposed in the gaps therebetween, where the gaps have a width of approximately 20 micrometers. Also, a magnetic head and a magnetic disk are protected from damage as a result of undesirable contacts in response to a mechanical shock. The motor 1 is especially suited for a portable personal computer since the motor 1 has a high electrical efficiency.

Only one hydrodynamic thrust bearing 10 is formed in the motor 1 on the upper surface 3a of the thrust plate 3, creating downward forces via fluid pressure within the thrust bearing 10 to balance the upward magnetic biasing force A of the stationary magnet 20 and magnet 19 acting on the rotor hub 17. No thrust bearing is formed on the lower surface 3b of the thrust plate 3 and the upward thrust load support pressure which would have been generated by a lower thrust bearing below the lower surface 3b of the thrust plate 3 is substituted with the axially upward magnetic biasing force A of the magnet 19 and stationary magnet 20 which serves to balance forces on the rotary shaft 2 and the thrust plate 3. Since there is no thrust bearing on the bottom surface of the thrust plate 3, bearing loss due to viscous resistance of the lubricant 8 against the spiral grooves 13 and 14 is reduced, thereby improving the electrical efficiency of the motor 1. Also since the thrust air interposing space 13 is formed below the bottom surface of the thrust plate 3, precise tolerances of the thickness of the thrust plate 3 and the widths of the gaps above and below the thrust plate 3 can be relaxed or loosened. For instance, the tolerance in the thickness of the thrust plate 3 can be increased, which makes the press work to produce the thrust plate easy and thereby reduces the production cost. Furthermore, there are no hydrodynamic pressure generating grooves formed on a lower surface of the thrust plate 3, thereby reducing the manufacturing cost of both elements of the motor 1.

Figure 6:
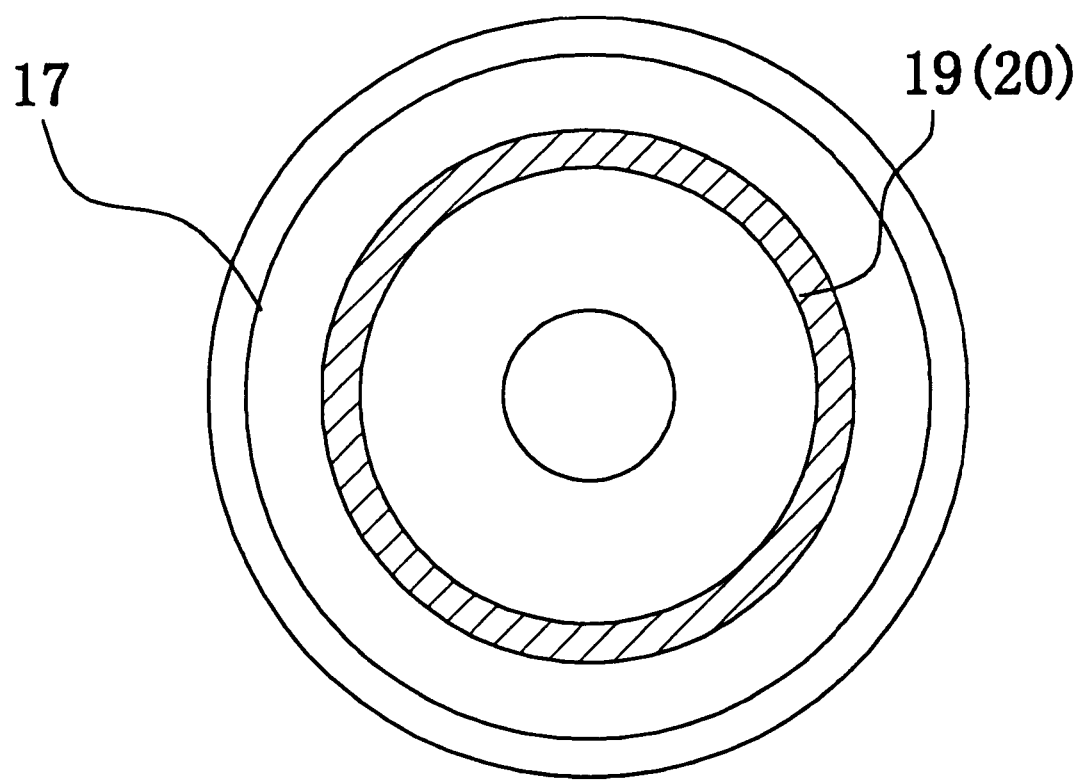
FIG. 6 is a bottom view of a rotor hub of the motor depicted in FIGS. 2 and 3, shown removed from the motor, showing details of a magnet mounted in a surface of the rotor hub.
Figure 7:
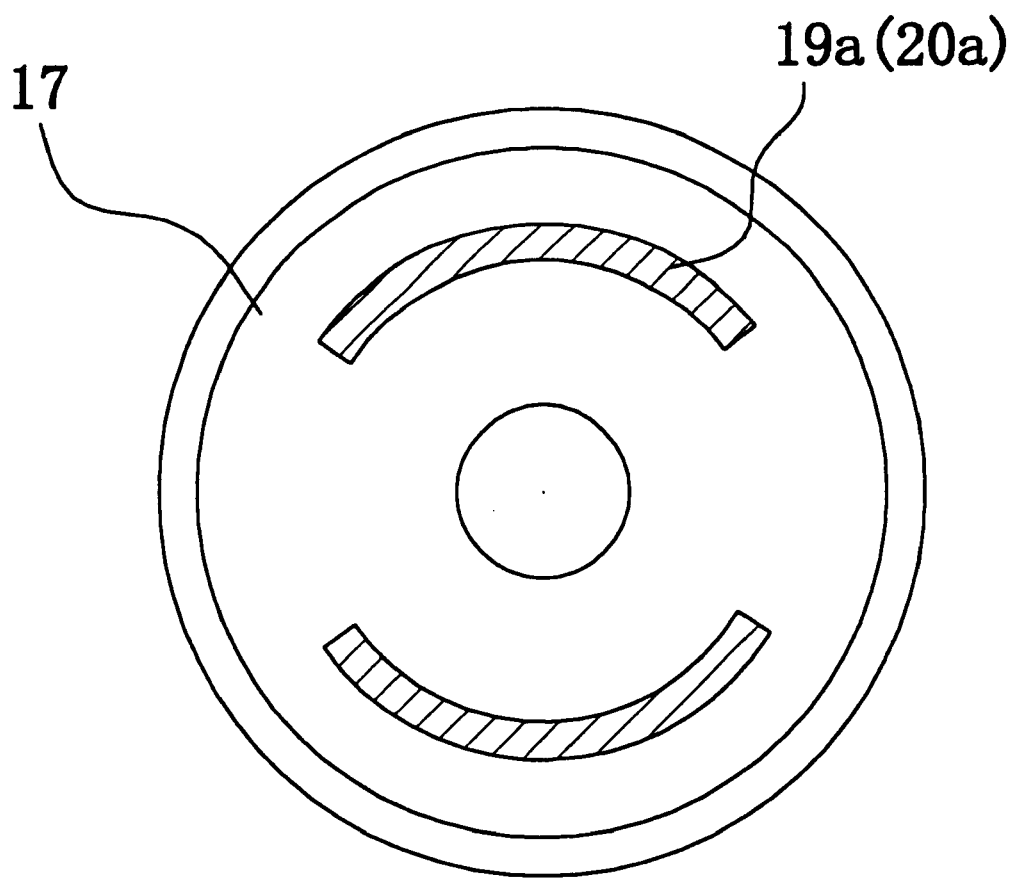
FIG. 7 and FIG. 8 are bottom views of the rotor hub of the motor, similar to FIG. 6, showing alternate configurations of magnets mounted to the surface of the rotor hub.
Figure 8:
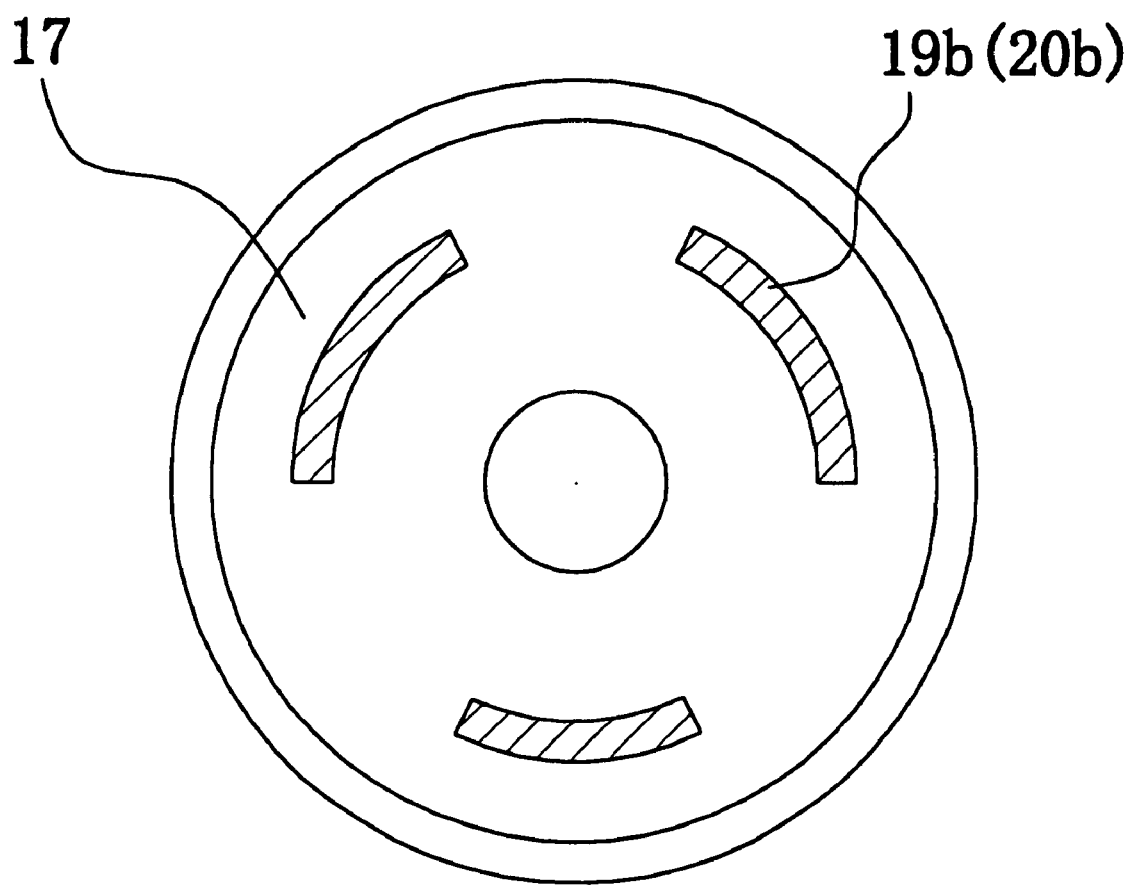

It should be understood that the magnets 19 and 20 may have any of a variety of configurations. For instance, in the embodiment described above, the magnets 10 and 20 may be solid, continuous annular rings as depicted in FIG. 6. Alternatively, the magnets 19 and 20 may be made up of a plurality of magnet segments, such as magnet segments 19a (and 20a) depicted in FIG. 7 and magnet segments 19b (and 20b) depicted in FIG. 8.

As should be understood from the above description, the magnets 19 and 20 functionally act as a thrust bearing urging the rotor hub 17 upward thereby limiting downward axial movement of the thrust plate 3, rotary shaft 2 and rotor hub 17. The force A from interaction between the magnets 19 and 20 provide a means for balancing the forces a1 and b1 acting to urge the thrust plate 3, rotary shaft 2 and rotor hub 17 downward. Therefore, the present invention only has one hydrodynamic thrust bearing and has a magnetic thrust bearing. Further, the present invention only has one hydrodynamic radial bearing that is defined on the surface 3c of the thrust plate 3 with the adjacent inner surface of the cylinder member 6 proximate the spiral grooves 11. Having a single hydrodynamic radial bearing and single hydrodynamic thrust bearing formed on the thrust plate 3 balanced by the interaction between the magnets 19 and 20, simplifies the overall structure of the motor 1 compared to the prior art, making for a smaller and less expensive motor.

It should be under stood that the magnets 19 and 20 may be made of any of a variety of magnetic materials. In an alternate embodiment, the magnets 19 and 20 may be made of a stainless steel. It should also be understood, that the rotor hub 17 in the first embodiment should be made of a non-magnetically susceptible material so as not to interfere with the repelling forces present between the magnets 19 and 20.

Second Embodiment

Figure 9:
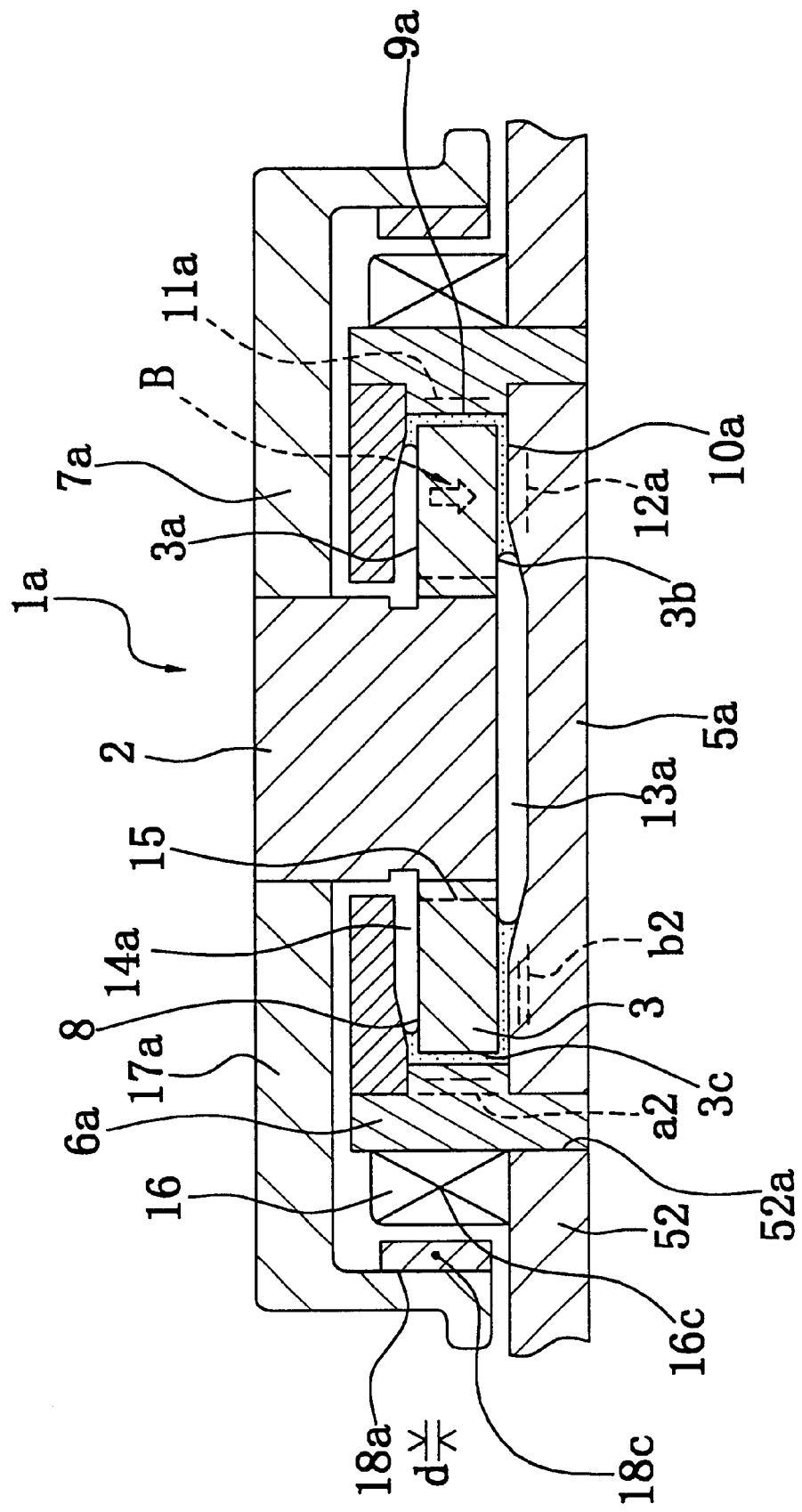
FIG. 9 is a longitudinal cross sectional side view of a motor showing internal details of a housing, rotary shaft and a hydrodynamic bearing according to a second embodiment of the present invention.

A second embodiment of the present invention is depicted in FIG. 9.

In view of the similarities between the second embodiment and the first embodiment, like reference numerals are utilized to refer to like elements where such elements are interchangeable between the first and second embodiments. Moreover, as will be apparent to those skilled in the art from the following description, the various like elements and descriptions thereof with respect to the first embodiment applies to the like elements in the second embodiment. Thus, the motor 1a of the second embodiment is not described or illustrated in as great detail as the first embodiment due to the similarities between the two embodiments. Rather, it will be apparent to those skilled in the art from this disclosure that the description of various elements and overall description of the first embodiment apply to the similar or identical elements of the second embodiment.

In the first embodiment depicted in FIGS. 3–5, the radial bearing 9 includes the spiral grooves 11 which created upward dynamic pressure in the lubricant 8 retained in the gap between the outer peripheral surface 3c of the thrust plate 3 and the inner peripheral surface of the cylinder member 6. Also in the first embodiment, the thrust bearing 10 includes the spiral grooves 12 which created radially outward dynamic pressure in the lubricant 8 retained in the gap between the upper surface 3a of the thrust plate 3 and the bottom surface of the annular thrust ring 7. In the motor 1a depicted in FIG. 9 in the second embodiment, similar spiral grooves are employed in a single thrust bearing and a single radial bearing formed on surfaces of the thrust plate 3 in the second embodiment, but having slightly different effects on the lubricant 8, as is described in greater detail below.

In the second embodiment, the motor 1a is supported by a bracket 52, which may be a support member in, for instance, a hard disc drive. The bracket 52 is formed with a central opening 52a into which a lower end of a cylinder member 6a is fixedly fitted. The cylinder member 6a is formed with spiral grooves 11a on a radially inner surface, as is described in greater detail below.

An upper portion of the cylinder member 6a has a central opening in which an annular plate 7a is fixedly fitted. A thrust cover 5a is fixedly fitted into an opening formed at the lower end of the cylinder member 6a.

As with the first embodiment, the second embodiment includes a rotary shaft 2 that extends through an opening formed in the annular plate 7a. A thrust plate 3 is fixedly fitted on a lower end of the rotary shaft 2, the thrust plate 3 having an upper surface 3a, a lower surface 3b and a radial outer peripheral surface 3c. A rotor hub 17a is fixedly fitted to an upper end of the rotary shaft 2. A rotor magnet 18a is fixedly fitted to an inner radial surface of the rotor hub 17a facing, but spaced apart from a stator 16 fixedly fitted to a radially outer surface of the cylinder member 6a.

The stator 16 has a magnetic center 16c and the rotor magnet 18a also has a magnetic center 18c. The respective magnetic centers 16c and 18c are physical locations within the stator 16 and rotor magnet 18a, respectively, but the magnetic centers are more than just a physical location. The magnetic centers 16c and 18c represent a focal point of the magnetic forces inherent in a magnet. In other words, the lines of force associated with a magnet are centered about the magnetic center of the magnet.

The magnetic center 16c of the stator 16 is axially offset from the magnetic center 18c of the rotor magnet 18a by a distance d, as is shown in FIG. 9, resulting in an axial imbalance with respect to the interaction of the magnetic forces between the rotor magnet 18a and stator 16. Specifically, the rotor magnet 18a and stator 16 are configured with opposite magnetic poles facing one another such that the rotor magnet 18a and stator 16 are attracted to each other via magnetic forces. Since the magnetic centers 16c and 18c are axially offset from one another, the stator 16 magnetically urges the rotor magnet 18a downward toward the magnetic center 16c, with respect to the depiction in FIG. 9. Therefore, due to the above described magnetic forces, the rotor hub 17a, the shaft 2 and the thrust plate 3 are all urged downward. The magnetic force urging the magnetic center 18c toward the magnetic center 16c thereby urging the rotary shaft 2 and thrust plate 3 downward is represented by the force B in FIG. 9.

It should be understood that the stator 16 is an electric magnet that may be selectively supplied with electric current in order to cause rotation of the rotor hub 17a and shaft 2, but the stator 16 is also made of a permanently magnetic material and therefore the stator 16 magnetically attracts the rotor magnet 18a regardless of whether or not electric current is supplied to the stator 16.

In the motor shown in the FIG. 9, a radial bearing 9a is defined by the surface 3c and the adjacent inner surface of the cylinder member 6a. Spiral grooves 11a are form on the adjacent inner surface of the cylinder member 6a, shown more clearly in FIG. 10, also forming part of the radial bearing 9a. The spiral grooves 11a are configured to create downward dynamic pressure as the thrust plate 3 rotates, the dynamic pressure being represented by a force a2 in FIG. 9. The force a2 is created in the lubricant 8 retained in the gap between the outer peripheral surface 3c of the thrust plate 3 and the inner peripheral surface of the cylinder member 6a. A thrust bearing 10a is defined in the motor 1a by the lower surface 3b of the thrust plate 3, a radial outer portion of an upper surface of the thrust cover 5a, and spiral grooves 12a formed on the thrust cover 5a. The spiral grooves 12a, shown more clearly in FIG. 11, are configured to create radially outward pressure in the lubricant 8 as the thrust plate 3 rotates, the radial outward pressure being represented by force b2 in FIG. 9. The force b2 is dynamic pressure created in the lubricant 8 retained in the gap between the lower surface 3b of the thrust plate 3 and the upper surface of the thrust cover 5a. The forces a2 and b2 urge the lubricant 8 toward a radially outer portion of the lower surface 3b of the thrust plate 3, creating an increase in fluid pressure below the thrust plate 3 thereby urging the thrust plate 3, rotary shaft 2 and rotor hub 17a upward.

In the motor 1a shown in FIG. 9, an thrust air interposing space 13a is formed between the upper surface 3a of the thrust plate 3 and the bottom surface of the annular plate 7a. An air space 14a is formed below radial inner portions of the lower surface 3b of the thrust plate 3, radially inward from the thrust bearing 10a. The air spaces 13a and 14a are connected to each other via the air conduit 15 formed on an inner periphery of the thrust plate 3. As can be seen in FIG. 9, the thrust air interposing space 13a has an outer diameter that is much larger than the diameter of the air space 14a.

Since the air space 14a is defined on the upper surface 3a of the thrust plate 3 and has a relatively large diameter, no thrust bearing per se is formed at the upper side of the thrust plate 3. There is only one is hydrodymanic thrust bearing present in the motor 1a and that is the thrust bearing 10a formed with the radially outer portion of the lower surface 3b of the thrust plate 3.

As mentioned above, the rotor magnet 18a and the stator 16, are provided with polar orientations whereby they are magnetically attracted to each other. As a result of the magnetic attraction between the magnetic centers 16c and 18c, the rotor magnet 18a, rotor hub 17a, rotary shaft 2 and thrust plate 3 are urged downward by the axially downward force B. Although no thrust bearing is formed by the upper surface 3a of the thrust plate 3, force B provides a downward thrust load to balance the upward force created under the thrust plate 3 in the lubricant 8 by action of the spiral grooves 11a and 12a as the thrust plate 3 rotates. The magnetic biasing force B produced by the rotor magnet 18a and the stator 16 in effect functions as a second thrust bearing to counteract and balance the forces a2 and b2.

Figure 10:
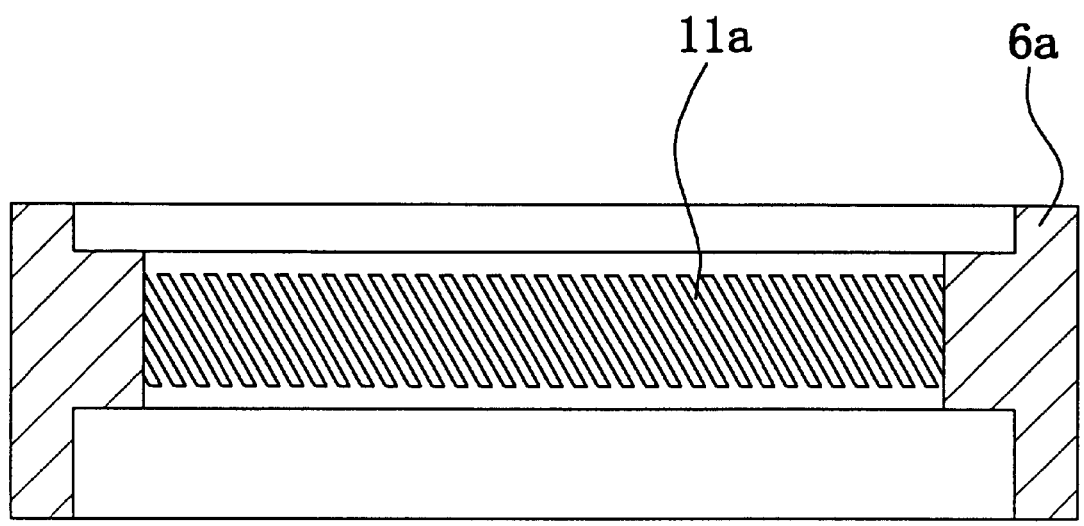
FIG. 10 is a cross sectional side view of a sleeve portion of the housing of the motor depicted in FIG. 9, with other portions of the motor removed to show spiral grooves formed on an inner surface of the sleeve portion.
Figure 11:
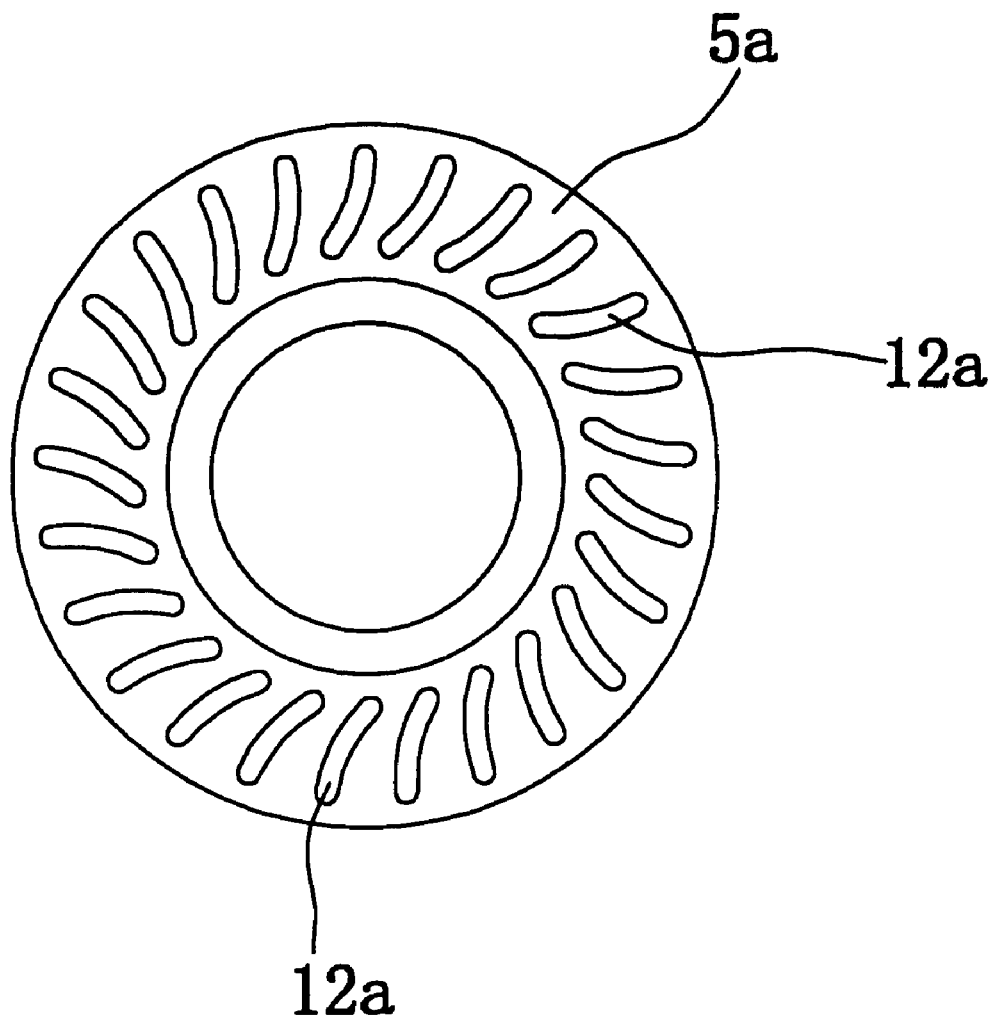
FIG. 11 is a top view of a thrust cover of the housing of the motor depicted in FIG. 12, with the thrust cover removed from the motor to show spiral grooves formed on an upper surface of the thrust cover.

The spiral grooves 11a and 12a are similar to those described above with respect to the first embodiment and can be in the form of generally straight grooves similar to those depicted in FIGS. 4 and 5 in a manner similar to the first embodiment, or, the spiral grooves 11a and 12a may have a curved or arcuate form depicted in FIGS. 10 and 11.

Although the above described embodiments use spiral grooves for surfaces within both a radial bearing and a thrust bearing, it is possible to include any of a variety of shaped grooves so long as the groove create the desired fluid dynamic pressure in the lubricant between the surfaces of the bearings. For instance, the thrust and radial bearings may each include a respective surface having imbalanced herringbone grooves to create the desired dynamic fluid pressure in the lubricant between the corresponding surfaces of the thrust and radial bearings in order to urge a thrust plate in an axial direction to balance magnetic forces urging the thrust plate in an opposite axial direction. In such motor, the dynamic fluid pressure of the lubricant retained in the spiral grooves of the thrust bearing is also designed to be balanced with the dynamic fluid pressure of the lubricant retained in the unbalanced herringbone grooves of the radial bearing. Even if the balance between the fluid dynamic pressures is lost, the radial bearing may still retain lubricant, which generates pressure to maintain the rotary shaft in a centered position in the housing, thereby continuing to support the rotor securely in the radial direction within the housing.

The motor of the present invention having the spiral grooves as dynamic pressure generating grooves in a radial bearing and a thrust bearing has improved electrical efficiency when comparison with a conventional motor having only herringbone grooves because there is, for example, a reduction of bearing losses due to fluid movement in opposing direction within V-shaped herringbone grooves. Furthermore, the structure of the motor is simplified by the elimination of oil circulation structures often used in conventional motors, thereby reducing the production cost. When a motor includes spiral grooves as dynamic pressure generation grooves in the thrust bearing, and imbalanced herringbone grooves as dynamic pressure generation grooves in the radial bearing, the radial bearing is capable of retaining an amount of circulating lubricant necessary and sufficient to generate pressure to center of the rotor in the motor housing and to axially support the rotor in the radial bearing. Also, since the thrust plate limits the axial vibrations of the rotor along with a magnetic biasing in an opposing direction, the amount of axial movement of the rotor can be kept minimal, thereby protecting the data storage medium and the magnetic head which is disposed adjacent to the data storage medium to read and write data therefrom and thereto, maintaining the reading and writing functions of the data storage device.

The present invention provides a motor having a hydrodynamic bearing configuration and adapted to be used in a thin hard disk drive device with an improved electrical efficiency and a reduction in production costs.

It should be apparent to those skilled in the art from this disclosure that various changes and modifications can be made herein without departing from the scope of the invention as defined in the appended claims.

Figure 12:
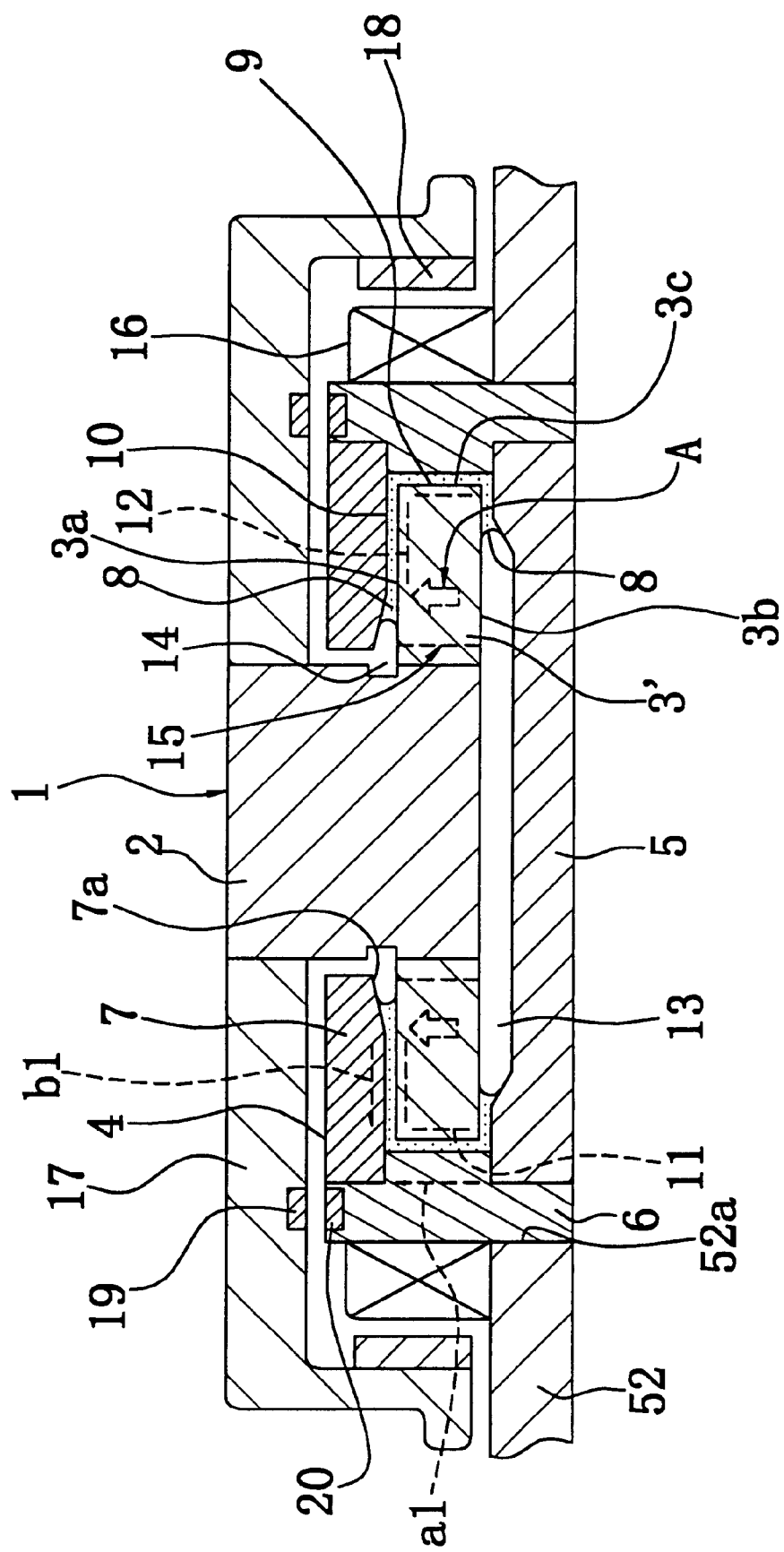
FIG. 12 is a longitudinal cross sectional side view similar to FIG. 3, showing a third embodiment of the present invention.

For instance, in the first embodiment depicted in FIG. 3, the spiral grooves 11 are formed on the surface of protrusion 6p of the cylinder member 6. The spiral grooves 11 could alternatively be formed on the outer peripheral surface 3c of a thrust plate 3', as depicted in FIG. 12 in a third embodiment. Similarly the spiral grooves 12 formed on the lower surface of the thrust ring 7 in FIG. 3 could alternatively be formed on the upper surface 3a of the thrust plate 3', as is also shown in FIG. 12. It should be understood that all of the various features depicted in FIG. 12 and identified by common reference numbers are the same as those depicted in FIG. 3 with the exception that the spiral grooves 11 and 12 are now formed on the thrust plate 3' in the third embodiment in FIG. 12.

Figure 13:
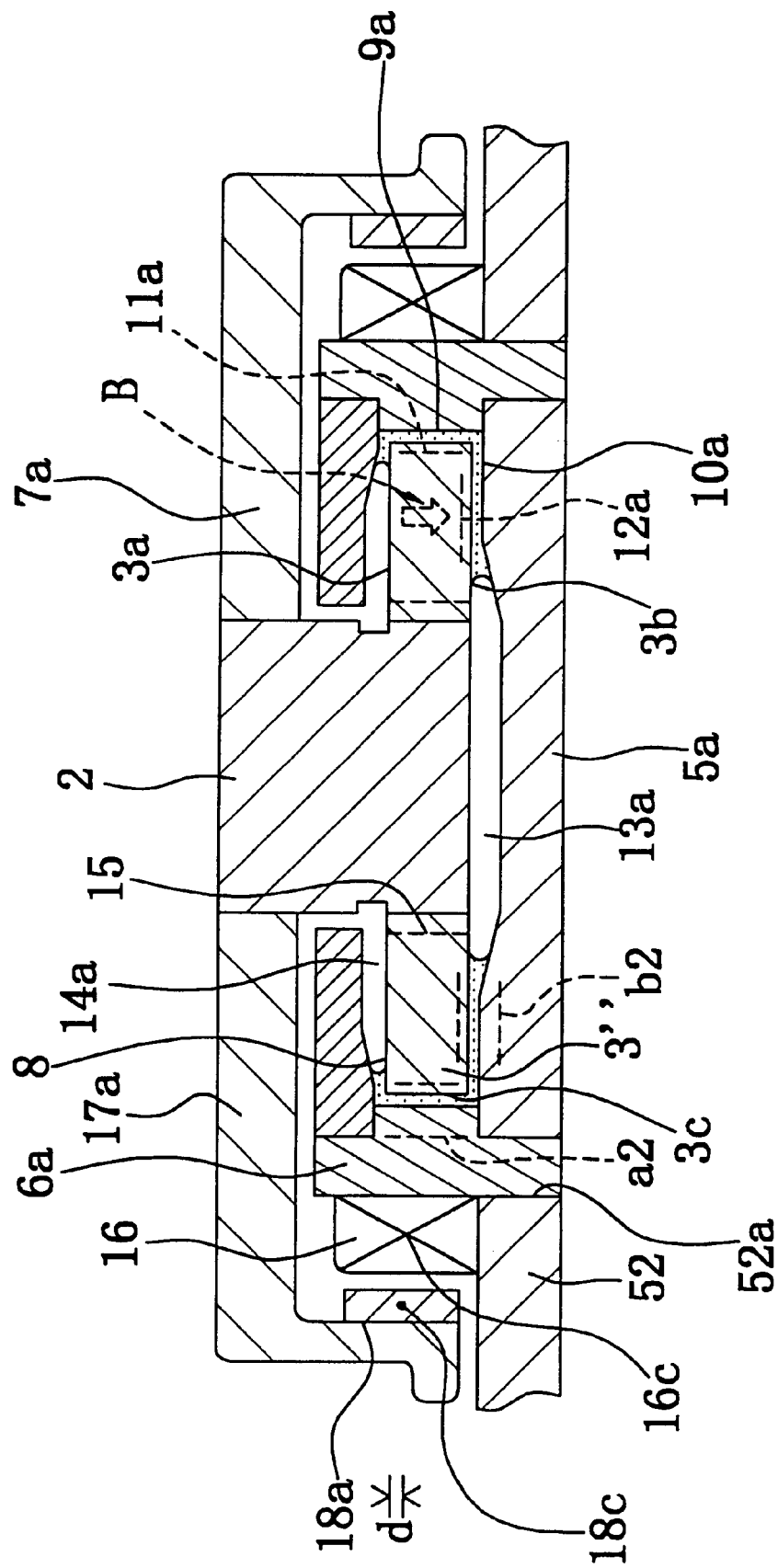
FIG. 13 is a longitudinal cross sectional side view similar to FIG. 9, showing a fourth embodiment of the present invention.

Further, in the second embodiment depicted in FIG. 9, the spiral grooves 11a could alternatively be formed on the outer peripheral surface 3c of the thrust plate 3", as is shown in FIG. 13 in a fourth embodiment. Similarly the spiral grooves 12a formed on the upper surface of the thrust cover 5a in FIG. 9 could alternatively be formed on the lower surface 3b of the thrust plate 3", as is shown in FIG. 13. It should be understood that all of the various features depicted in FIG. 13 and identified by common reference numbers are the same as those depicted in FIG. 9 with the exception that the spiral grooves 11a and 12a are now formed on the thrust plate 3" in the fourth embodiment in FIG. 12.

Figure 14:
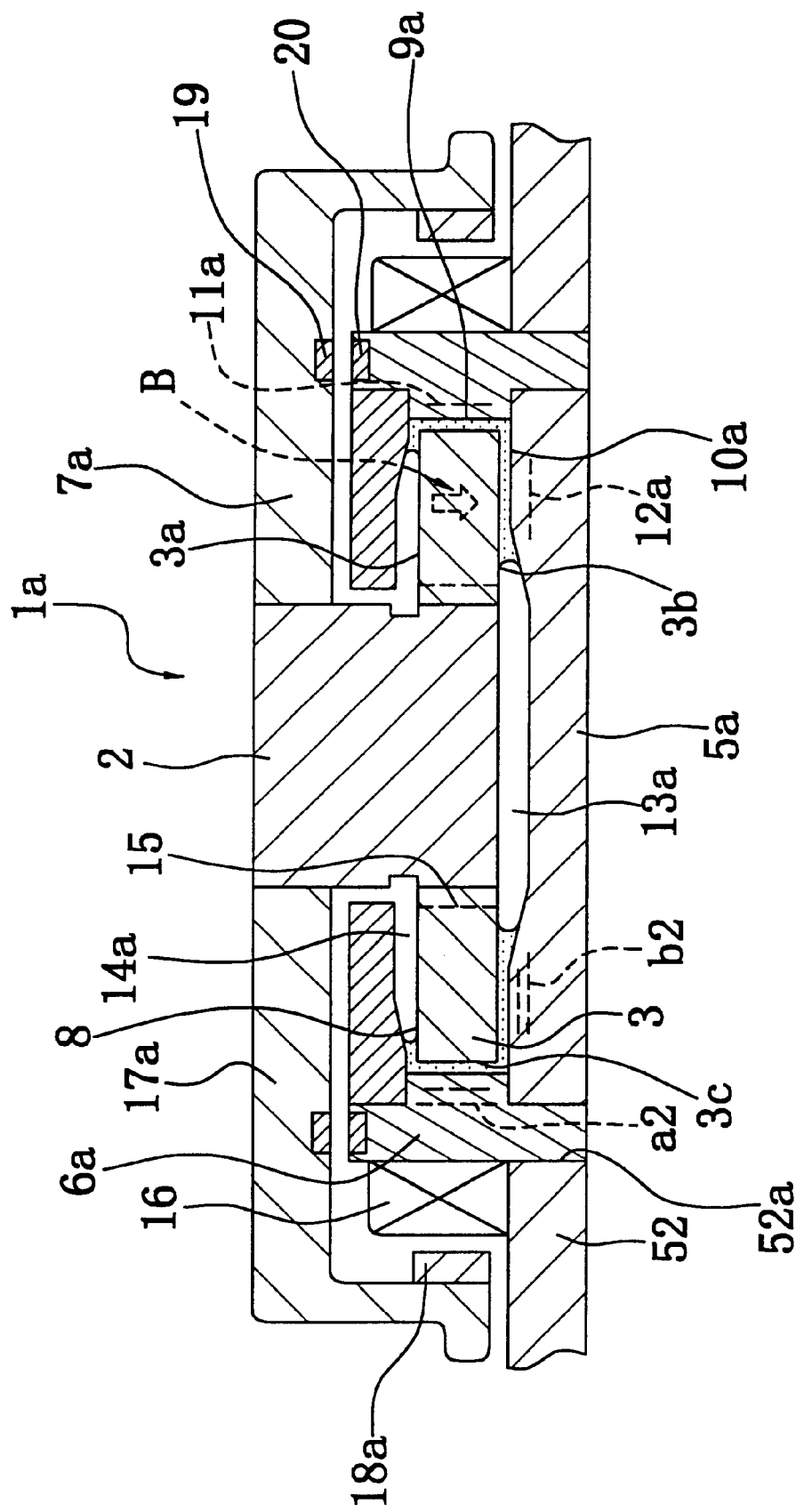
FIG. 14 is a longitudinal cross sectional side view similar to FIG. 9, showing a fifth embodiment of the present invention.

Other alternative configurations of the present invention are also considered by the inventors. For example, the magnets 19 and 20 of the first embodiment depicted in FIG. 3 may be added to the motor 1a depicted in FIG. 9 with the magnets 19 and 20 being oriented to be magnetically attracted to one other to counterbalance the fluid dynamic pressure created between the thrust cover 5a and the thrust plate 3, as is shown in FIG. 14 in a fifth embodiment. In such a configuration, the offset d between the magnetic centers 18c and 16c of the rotor magnet 18a and the stator 16, respectively, depicted in FIG. 9, are now unnecessary. In such a configuration, the fluid dynamic pressure generated in the bearings 9a and 10a urge the thrust plate 3 upward and the magnetic attraction between the magnets 19 and 20 urge the rotor hub 17a, shaft 2 and thrust plate 3 downward. It should be understood that all of the various features depicted in FIG. 14 and identified by common reference numbers are the same as those depicted in FIG. 9 with the exception that the magnets 19 and 20 are employed to urge the rotor hub 17a, rotary shaft 2 and thrust plate 3 downward in the fifth embodiment depicted in FIG. 14.

Figure 15:
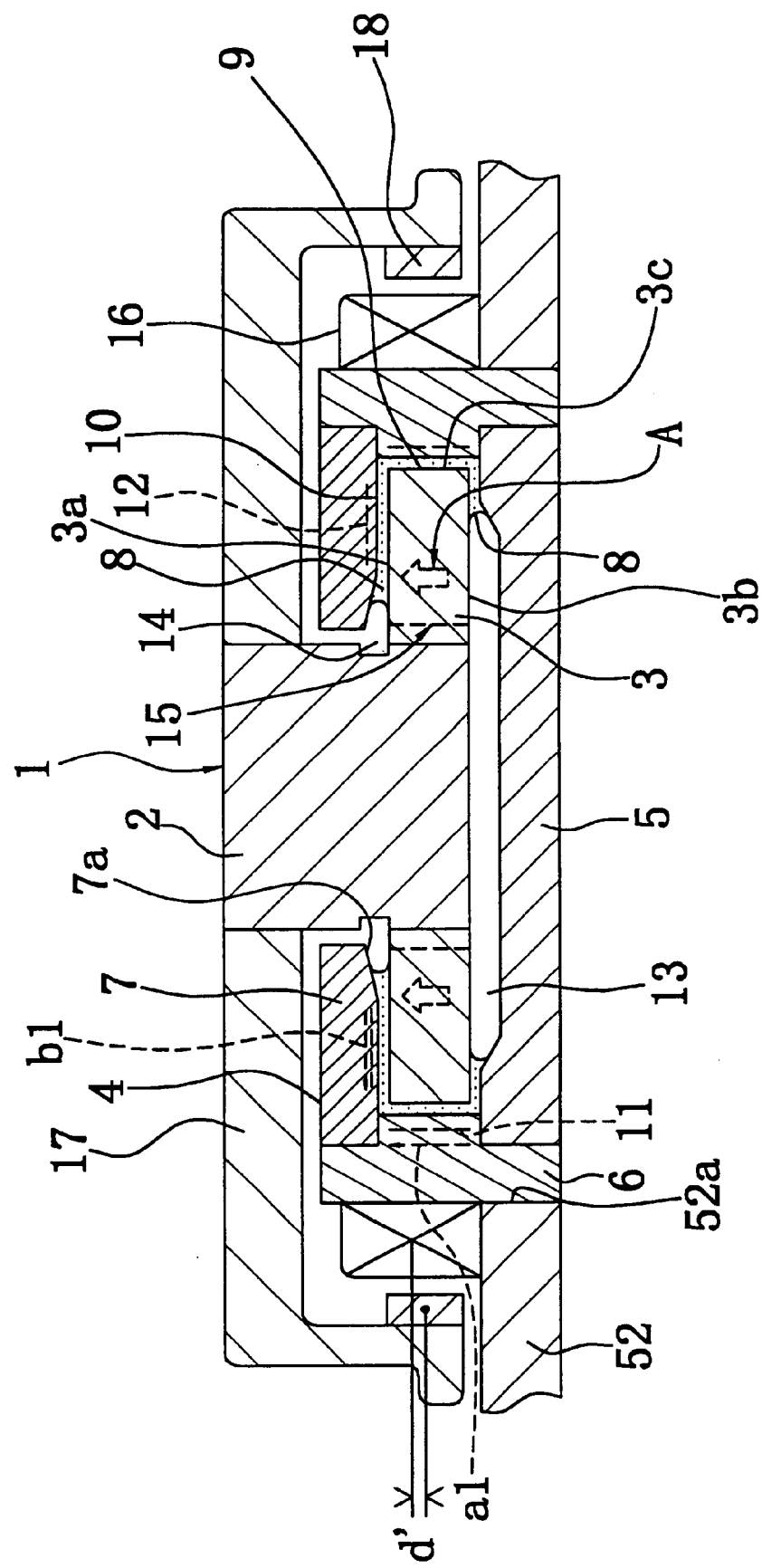
FIG. 15 is a longitudinal cross sectional side view similar to FIG. 3, showing a sixth embodiment of the present invention.

In a sixth embodiment of the present invention, the motor depicted in FIG. 3 may be manufactured without the magnets 19 and 20 and the magnetic center of the rotor magnet 18 may be offset from the magnetic center of the stator 16 by a distance d', as depicted in FIG. 15. The offset between the magnetic center of the rotor magnet 18 and the magnetic center of the stator 16 is such that the magnetic attraction therebetween urges the rotor hub 17, the shaft 2 and the thrust plate 3 upward against the downward urging of the hydrodynamic forces created in the lubricant of the bearings 9 and 10. It should be understood that all of the various features depicted in the sixth embodiment in FIG. 15 and identified by common reference numbers are the same as those depicted in FIG. 3 with the exception that the magnets 19 and 20 are now unnecessary due to offset d' between the rotor magnet 18 and the stator 16.

The foregoing description of the embodiments according to the present invention is provided for illustration only, and not for the purpose of limiting the invention as defined by the appended claims and their equivalents.

What is claimed is:

1. A motor comprising:
    a shaft;
    a thrust plate fixed to said shaft;
    a housing surrounding said shaft and said thrust plate, a gap being formed between an inner surface of said housing and an outer peripheral surface of said thrust plate, said gap being further extended between one substantially planar surface of said thrust plate and confronting surface of said housing, said gap being filled with lubricant;
    a single hydrodynamic radial bearing being constituted by said inner surface of said housing, said outer peripheral surface of said thrust plate and said lubricant for generating hydrodynamic pressure to support radial loads acting on said shaft and said thrust plate against said housing;
    a single hydrodynamic thrust bearing being constituted by said substantially planar surface of said thrust plate, said confronting surface of said housing and said lubricant for generating hydrodynamic pressure to support axial loads acting on said shaft and said thrust plate against said housing in a first axial direction; and
    means for generating magnetically supporting force for supporting said shaft and said thrust plate against said housing in a second axial direction such that said hydrodynamic pressure of said single hydrodynamic thrust bearing and magnetic force of said magnetically supporting force generating means is balanced with each other to cooperatively support axial loads acting on said shaft and said thrust plate against said housing in said first and second axial directions.

2. The motor as set forth in claim 1, wherein said radial bearing is formed with spiral grooves configured to urge said lubricant in said first axial direction and said thrust bearing is formed with spiral grooves configured to urge said lubricant radially outward thereby increasing fluid pressure between said thrust plate and said housing urging said thrust plate and said shaft in said second axial direction.

3. The motor as set forth in claim 2, wherein said spiral grooves are formed on said inner surface of said housing and said confronting surface of said housing.

4. The motor as set forth in claim 2, wherein said spiral grooves are formed on said outer peripheral surface of said thrust plate and said substantially planar surface of said thrust plate.

5. The motor as set forth in claim 2, wherein said means for selectively rotating said shaft includes a stator fixed to an outer portion of said housing.

6. The motor as set forth in claim 5, further comprising:
    a rotor hub fixed to one end of said shaft, said rotor hub having a radially outer ring portion that surrounds said stator;
    a rotor magnet fixed to an inner surface of said ring portion of said rotor hub, said rotor magnet being spaced apart from said stator; and
    wherein said means for generating magnetically supporting force comprises an offset between respective magnetic centers of said rotor magnet and said stator such that magnetic attraction therebetween urges said rotor hub, said shaft and said thrust plate in said second axial direction.

7. The motor as set forth in claim 5, further comprising:
    a rotor hub fixed to one end of said shaft, said rotor hub having a radially outer ring portion that surrounds said stator;
    a rotor magnet fixed to an inner surface of said ring portion of said rotor hub, said rotor magnet being spaced apart from said stator; and
    wherein said means for generating magnetically supporting force comprises a first permanent magnet fixed to said rotor hub and a second permanent magnet fixed to said housing confronting said first permanent magnet urging said rotor hub, said shaft and said thrust plate in said second axial direction.

8. The motor as set forth in claim 7, wherein said first and second permanent magnets are magnetically oriented to repel one another.

9. The motor as set forth in claim 7, wherein said first and second permanent magnets are magnetically oriented to be attracted to one another.

10. The motor as set forth in claim 1, wherein said thrust plate is formed with a second substantially planar surface on a side of said thrust plate opposite said substantially planar surface, said second substantially planar surface and an adjacent portions of said housing surrounding a disk shaped air interposing space defined therebetween, said thrust plate being formed with an air passage that is open to said air interposing space thereby allowing communication of air between said air interposing space and air outside of said housing.

11. A motor comprising:

a shaft;

a disk-shaped thrust plate fixed to said shaft;

a housing surrounding said shaft and supporting said shaft and said thrust plate, with a gap being formed between inner surrounding surfaces of said housing and outer surfaces of said shaft and said thrust plate for rotation of said shaft and said thrust plate relative to said housing, said gap having a first portion formed between one planar surface of said thrust plate and a first confronting inner surface of said housing, said gap also having a second portion formed between a circumferentially extending portion of said outer surface of said thrust plate and a second confronting inner surface of said housing, bearing grooves being formed on a surface defining said first and second portions of said gap;

lubricant disposed in said first and second portions of said gap forming a single hydrodynamic thrust bearing and a single hydrodynamic radial bearing so as to generate hydrodynamic pressure acting on axially and radially direction; and means for generating counterbalancing forces against said hydrodynamic pressure of said hydrodynamic thrust bearing such that said single hydrodynamic thrust bearing and said counterbalancing force generating means cooperatively support axial loads acting on said shaft and said thrust plate against said housing in axial directions.

12. The motor as set forth in claim 11, wherein said bearing grooves are spiral grooves.

13. The motor as set forth in claim 11, wherein said means for generating counterbalancing forces against said hydrodynamic pressure of said thrust hydrodynamic bearing comprises a first magnet means fixed to said housing and a second magnetic means supported on said shaft, said first and second magnet being located proximate one another and being configured to magnetically repel one another.

14. The motor as set forth in claim 11, wherein said means for generating counterbalancing forces against said hydrodynamic pressure of said thrust hydrodynamic bearing comprises a first magnet means fixed to said housing and a second magnetic means supported on said shaft, said first and second magnet being located proximate one another and being configured to magnetically attract one another.

15. The motor as set forth in claim 11, wherein an air interposing space is defined between a second planar surface of said thrust plate and a confronting adjacent inner surface of said housing.

16. A spindle motor comprising:

a shaft;

a single, disk-shaped thrust plate fixed endwise to said shaft, said thrust plate therein forming a substantially planar disk surface at the end of said shaft and having a substantially planar annular surface opposite the disk surface and an outer circumferential surface between the disk and annular surfaces;

a housing closely surrounding said thrust plate fixed to said shaft, said housing including a cover section having a cover surface axially opposing the disk surface of said thrust plate by a cover section small gap at least along the circumferentially peripheral margin of said thrust plate, a ring section encircling said shaft and having a ring surface axially opposing the annular surface of said thrust plate by a ring section small gap at least along the circumferentially peripheral margin of said thrust plate, and a cylindrical section having an inner cylindrical surface radially opposing the circumferential surface of said thrust plate by a cylindrical section small gap along said thrust plate in axial thickness, the cylindrical section small gap therein continuous with the cover section small gap and the ring section small gap;

a lubricant filling the continuous small gaps;

one and only one hydrodynamic-pressure thrust bearing including hydrodynamic pressure-generating grooves formed in one surface selected from the ring surface of the ring section of said housing, the annular surface of said thrust plate, the disk surface of said thrust plate, and the cover surface of the cover section of said housing, and the small gap between the selected surface and its axially opposing surface, wherein said small gap between the selected surface and its axially opposing surface extends radially inward from the circumferentially peripheral margin of said thrust plate;

a single hydrodynamic-pressure radial bearing continuous with said single hydrodynamic-pressure thrust bearing, said hydrodynamic-pressure radial bearing including hydrodynamic pressure-generating grooves formed in one surface selected from the circumferential surface of said thrust plate and the inner cylindrical surface of the cylindrical section of said housing, and the small gap between the selected surface and its radially opposing surface; and means for magnetically counterbalancing hydrodynamic pressure generated in said single hydrodynamic pressure thrust bearing when the spindle motor spins.

* * * * *